United States Patent
Sidebottom et al.

(10) Patent No.: US 10,644,943 B1
(45) Date of Patent: May 5, 2020

(54) MULTILAYER AND INTERACTIVE USER INTERFACES FOR DISPLAYING FEATURES OF AN OPTIMIZED NETWORK PLAN

(71) Applicant: Juniper Networks, Inc., Sunnyvale, CA (US)

(72) Inventors: Greg Sidebottom, Ottawa (CA); Zhifei Fang, Ottawa (CA)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

(21) Appl. No.: 16/366,624

(22) Filed: Mar. 27, 2019

(51) Int. Cl.
*H04B 10/00* (2013.01)
*H04L 12/24* (2006.01)
*H04Q 11/00* (2006.01)

(52) U.S. Cl.
CPC ........ *H04L 41/0826* (2013.01); *H04L 41/145* (2013.01); *H04L 41/22* (2013.01); *H04Q 11/0066* (2013.01); *H04Q 2011/0081* (2013.01)

(58) Field of Classification Search
CPC combination set(s) only.
See application file for complete search history.

(56) References Cited

U.S. PATENT DOCUMENTS

| | | | | |
|---|---|---|---|---|
| 6,535,227 B1* | 3/2003 | Fox | .......................... | H04L 41/20 709/223 |
| 7,096,176 B1* | 8/2006 | Hess | ....................... | H04B 10/07 703/13 |
| 7,096,502 B1* | 8/2006 | Fox | .......................... | H04L 41/28 707/999.008 |
| 7,149,975 B1* | 12/2006 | Johnson | ................... | H04L 41/22 715/734 |
| 8,897,641 B2* | 11/2014 | Doverspike | ........ | H04Q 11/0062 370/238 |
| 8,989,018 B2* | 3/2015 | Li | ....................... | H04J 14/0269 370/238 |
| 9,264,344 B2* | 2/2016 | Li | ....................... | H04J 14/0269 |
| 9,686,146 B2* | 6/2017 | Lingafelt | ............ | H04L 41/0654 |
| 10,439,888 B2* | 10/2019 | Felbinger | .............. | H04L 41/145 |
| 2005/0069314 A1* | 3/2005 | De Patre | ............. | H04J 14/0227 398/5 |
| 2005/0198247 A1* | 9/2005 | Perry | .................... | H04L 7/0008 709/223 |

(Continued)

*Primary Examiner* — Agustin Bello
(74) *Attorney, Agent, or Firm* — Harrity & Harrity, LLP

(57) ABSTRACT

A device receives network data associated with a network that includes network devices interconnected by links at an Internet protocol (IP) layer and an optical layer of the network. The device receives constraints associated with determining a network plan for the network, and determines multiple potential network plans for the network based on the constraints and the network data. The device generates a multilayer and interactive user interface associated with the multiple potential network plans, and provides the multilayer and interactive user interface to a client device. The device receives, from the client device, information indicating an interaction with the multilayer and interactive user interface, and modifies the multilayer and interactive user interface, based on the information indicating the interaction, to generate a modified multilayer and interactive user interface. The device provides, to the client device, the modified multilayer and interactive user interface.

20 Claims, 17 Drawing Sheets

(56) References Cited

U.S. PATENT DOCUMENTS

| | | | | |
|---|---|---|---|---|
| 2005/0281271 | A1* | 12/2005 | Beshai | H04L 45/02 370/400 |
| 2008/0181609 | A1* | 7/2008 | Yi | H04L 41/145 398/58 |
| 2012/0113821 | A1* | 5/2012 | Foster | H04L 45/00 370/250 |
| 2013/0163990 | A1* | 6/2013 | DeCusatis | H04J 14/0278 398/68 |
| 2013/0227338 | A1* | 8/2013 | Lingafelt | H04L 41/0654 714/4.5 |
| 2013/0251360 | A1* | 9/2013 | Jenkins | H04J 14/0227 398/2 |
| 2015/0195186 | A1* | 7/2015 | Li | H04J 14/0269 398/45 |
| 2016/0091685 | A1* | 3/2016 | Raza | G02B 6/4452 398/19 |
| 2016/0134487 | A1* | 5/2016 | Lingafelt | H04L 41/0654 370/216 |
| 2016/0191194 | A1* | 6/2016 | Wood | H04J 14/0286 398/58 |
| 2017/0373943 | A1* | 12/2017 | Goel | H04L 41/145 |
| 2018/0026850 | A1* | 1/2018 | Obregon | H04L 41/145 709/223 |
| 2018/0262422 | A1* | 9/2018 | Gerstel | H04L 45/22 |
| 2019/0058638 | A1* | 2/2019 | Ahuja | H04L 41/145 |
| 2019/0166009 | A1* | 5/2019 | Parvin | H04L 41/145 |
| 2019/0253325 | A1* | 8/2019 | Coleman | H04L 12/2854 |
| 2019/0306011 | A1* | 10/2019 | Fenoglio | G06N 5/04 |

* cited by examiner

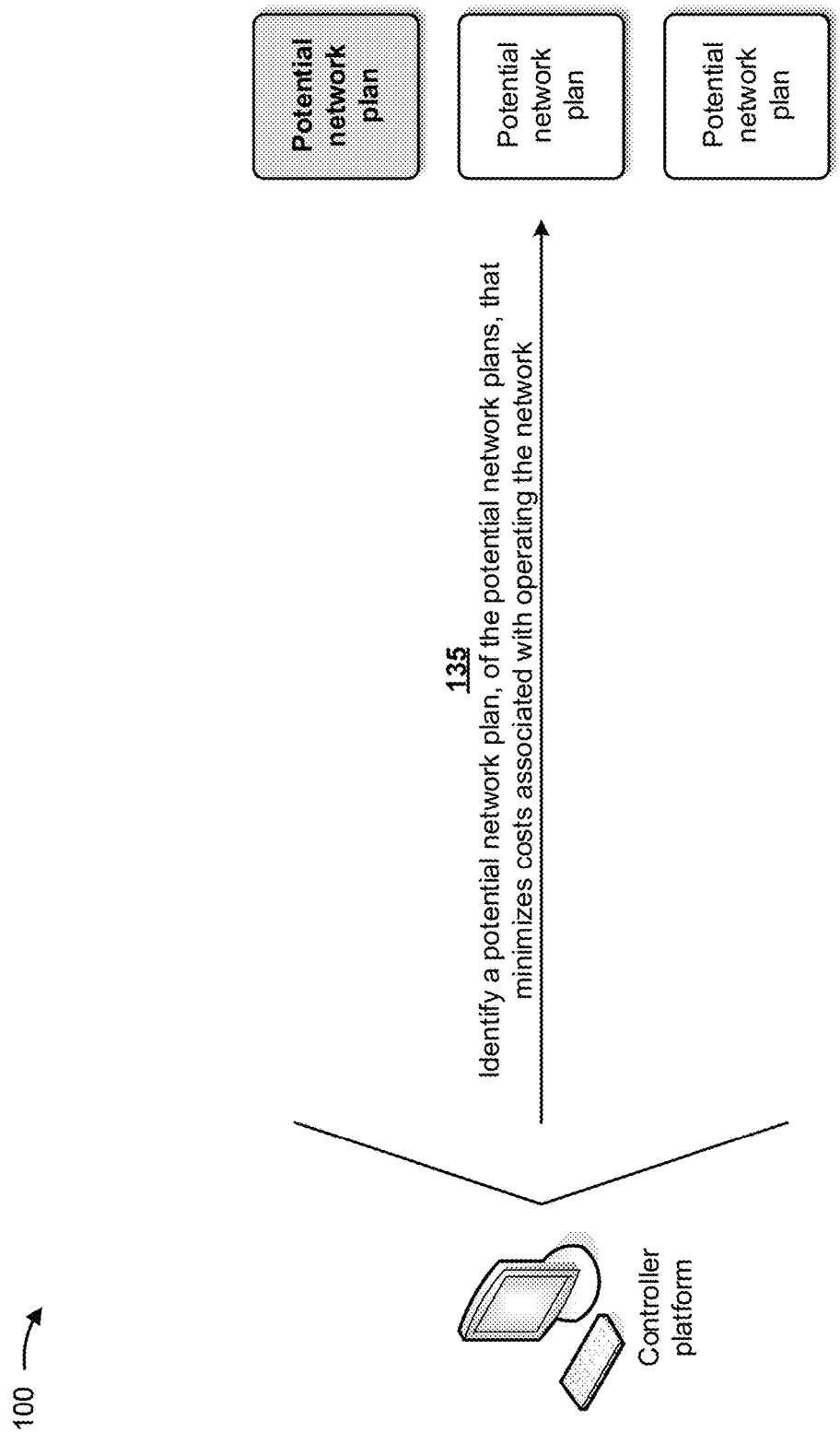

US 10,644,943 B1

MULTILAYER AND INTERACTIVE USER INTERFACES FOR DISPLAYING FEATURES OF AN OPTIMIZED NETWORK PLAN

BACKGROUND

Network planning and design is an iterative process, encompassing topological design, network-synthesis, and network-realization. Network planning and design is aimed at ensuring that a new or an existing network or service satisfies needs of network subscribers and/or network operators.

SUMMARY

According to some implementations, a method may include receiving network data associated with a network, wherein the network includes a plurality of network devices interconnected by links at an Internet protocol (IP) layer and an optical layer of the network, and receiving constraints associated with determining a network plan for the network. The method may include determining a plurality of potential network plans for the network based on the constraints and the network data, and generating a multilayer and interactive user interface associated with the plurality of potential network plans, wherein the multilayer and interactive user interface includes information enabling selection of one of the plurality of potential network plans, and a graphical representation of each of the plurality of potential network plans, when selected. The method may include providing the multilayer and interactive user interface to a client device, and receiving, from the client device, information indicating an interaction with the multilayer and interactive user interface. The method may include modifying the multilayer and interactive user interface, based on the information indicating the interaction, to generate a modified multilayer and interactive user interface associated with the plurality of potential network plans, and providing, to the client device, the modified multilayer and interactive user interface associated with the plurality of potential network plans.

According to some implementations, a device may include one or more memories, and one or more processors, communicatively coupled to the one or more memories, to receive network data associated with a network, wherein the network includes a plurality of network devices interconnected by links. The one or more processors may receive constraints associated with determining a network plan for the network, and may determine a plurality of potential network plans for the network based on the constraints and the network data. The one or more processors may generate a multilayer and interactive user interface associated with the plurality of potential network plans, wherein the multilayer and interactive user interface includes information identifying the plurality of potential network plans, and a graphical representation of a selected one of the plurality of potential network plans, wherein the graphical representation includes graphical representations of an IP layer and an optical layer of the selected one of the plurality of potential network plans. The one or more processors may provide, to a client device, the multilayer and interactive user interface associated with the plurality of potential network plans, wherein the multilayer and interactive user interface is capable of providing views of the graphical representation from multiple angles and multiple orientations.

According to some implementations, a non-transitory computer-readable medium may store instructions that include one or more instructions that, when executed by one or more processors, may cause the one or more processors to receive network data associated with a network, wherein the network includes a plurality of network devices interconnected by links, and receive constraints associated with determining a network plan for the network. The one or more instructions may cause the one or more processors to determine a plurality of potential network plans for the network based on the constraints and the network data, and generate a user interface associated with the plurality of potential network plans, wherein the user interface includes information identifying the plurality of potential network plans, and a graphical representation of a selected one of the plurality of potential network plans, wherein the graphical representation is capable of providing views of the graphical representation from multiple angles and multiple orientations. The one or more instructions may cause the one or more processors to provide, to a client device, the user interface associated with the plurality of potential network plans.

BRIEF DESCRIPTION OF THE DRAWINGS

FIGS. 1A-1L are diagrams of one or more example implementations described herein.

DETAILED DESCRIPTION

Figure 1A:
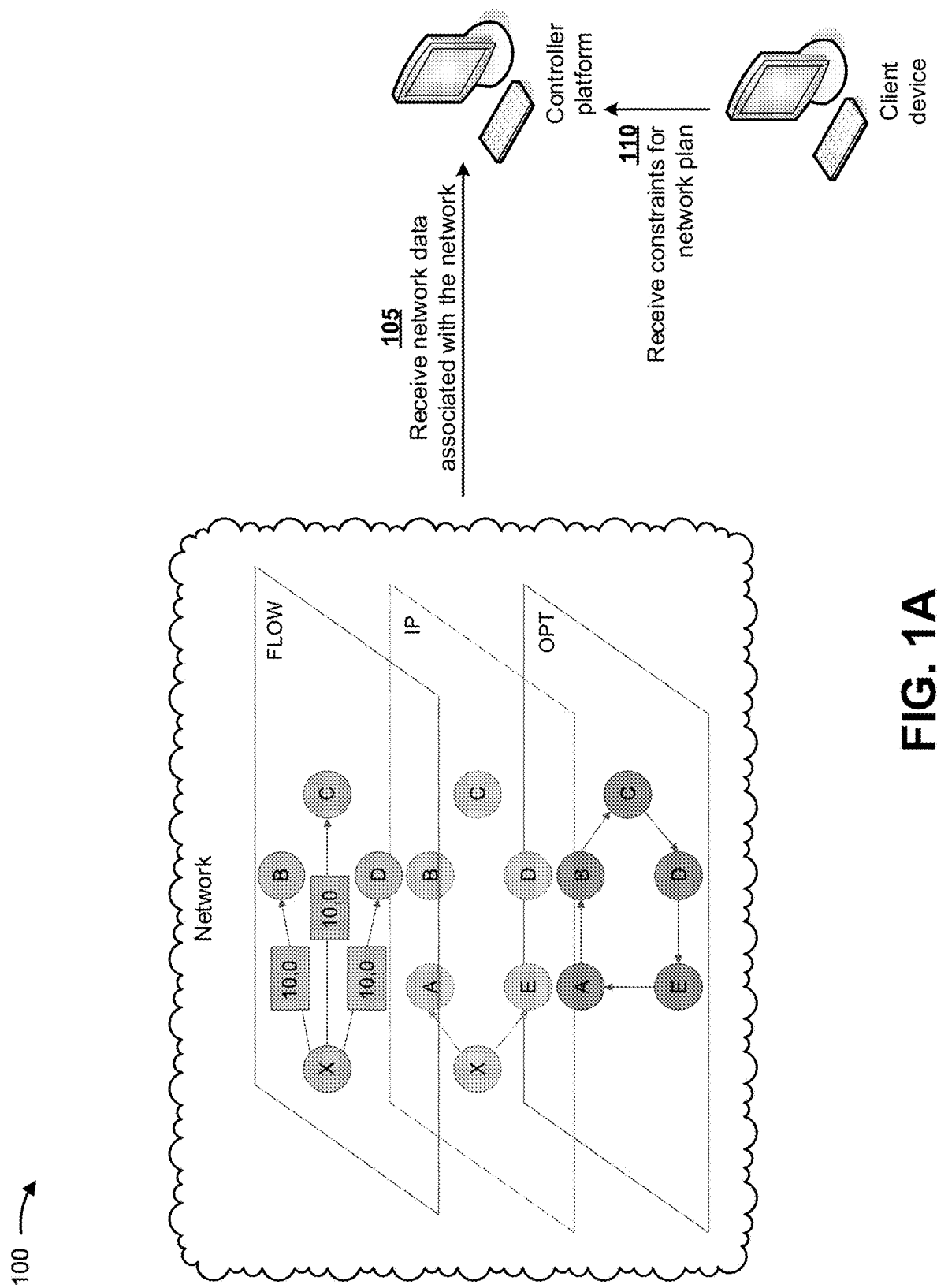

The following detailed description of example implementations refers to the accompanying drawings. The same reference numbers in different drawings may identify the same or similar elements.

A network planning and design system may design a network that includes network devices (e.g., routers, switches, gateways, firewalls, etc.) and links provided between the network devices. However, if the network to be designed is large (e.g., includes hundreds, thousands, etc. of network devices and/or links), the network planning and design system may generate a network plan that is complex and difficult to visualize and understand. The time spent attempting to understand a complex network plan may cause the network planning and design system to overuse computing resources (e.g., processing resources, memory resources, and/or the like), networking resources, and/or the like. Furthermore, a sub-optimal network plan that is not understood may still be implemented, which may waste computing resources, networking resources, and/or the like associated with identifying a sub-optimal network plan, correcting inefficient network operation caused by the sub-optimal network plan, correcting inefficient use of network resources caused by the sub-optimal network plan, and/or the like.

Some implementations described herein provide a controller platform that provides multilayer and interactive user interfaces for displaying features of an optimized network plan. For example, the controller platform may receive network data associated with a network that includes network devices interconnected by links, and may receive constraints associated with determining a network plan for the network. The controller platform may determine multiple potential network plans for the network based on the constraints and the network data. The controller platform may generate a multilayer and interactive user interface associated with the multiple potential network plans, where the multilayer and interactive user interface may include information identifying the multiple potential network plans, and a graphical representation of a selected one of the plurality of potential network plans. The graphical representation may include graphical representations of an IP layer and an optical layer of the selected one of the plurality of potential network plans. The controller platform may provide, to a client device, the multilayer and interactive user interface associated with the plurality of potential network plans, where the multilayer and interactive user interface may be capable of providing views of the graphical representation from multiple angles and multiple orientations.

In this way, the controller platform may provide multilayer and interactive user interfaces that provide a clear understanding of a network plan and prevent implementation of sub-optimal network plans. This, in turn, conserves computing resources (e.g., processing resources, memory resources, and/or the like), networking resources, and/or the like that would otherwise be wasted in identifying a sub-optimal network plan, correcting inefficient network operation caused by the sub-optimal network plan, correcting inefficient utilization of network resources caused by the sub-optimal network plan, and/or the like.

FIGS. 1A-1L are diagrams of one or more example implementations 100 described herein. As shown in FIG. 1A, a network may be associated with a controller platform. In some implementations, the network may include a packet optical network with multiple network devices and multiple links provided between the multiple network devices. In some implementations, the network may include multiple network layers, such as a flow layer (e.g., a logical layer not associated with network devices), an IP or packet layer, an optical layer, and/or the like. The network may include multiple sites and nodes (e.g., A, B, C, D, and E, although each site may include more than one node), a pseudo site (e.g., X) that represents the Internet, and demands at the flow layer (e.g., a demand, at the flow layer between sites X and C, of ten (10) megabits per second (Mb/s) in a forward direction and zero (0) Mb/s in a reverse direction).

In some implementations, the network may include a multilayer node provided in one or more of the layers. Nodes in two or more layers may be in adjacent layers. Thus, a multilayer node may not be provided in the flow and optical layers but may be provided in the flow and IP layers. Nodes may be provided in the flow layer if there are traffic demands between the nodes. Nodes may be provided in the IP layer if the nodes have IP routing capabilities and can be on ends of IP layer links. Nodes may be provided in the optical layer if the nodes have optical origination, termination, and/or switching capability. Optical connectivity may be required between sites, so that two IP nodes in different sites can have an IP link between them if the nodes are also in the optical layer. A network device (e.g., a router) with a long-haul dense wavelength division multiplexing (DWDM) interface card may be provided to connect the network device to optical switching (e.g., reconfigurable optical add-drop multiplexers (ROADMs)) or to other IP nodes with DWDM interface cards in a different site. IP nodes in the same site can be connected with IP links without requiring that the IP nodes be provided in the optical layer because the IP nodes can be connected with short haul copper or fiber cables. In the example of FIG. 1A, there may be no pure optical nodes but in general there could be intermediate pure optical nodes between nodes A-E in the optical layer.

The network may require assignment of network devices and/or links to the sites at the IP and optical layers. Question marks (not shown) may be provided between the flow and IP layers and may represent a quantity of traffic carried by a route or routes in the IP layer to satisfy traffic demands of the flow layer. Question marks may be provided in the IP layer and may represent a capacity of IP layer links, where the capacity of an IP link may be at least a sum of all traffic carried by all routes that use the IP link. Similar relationships may exist between the IP and optical layers where the links of the IP layer may induce demands to be routed at the optical layer. One difference is that traffic units at the optical layer may be different (e.g., in lambdas instead of MB/s), so a conversion may be performed before comparing if a link at the optical layer includes sufficient capacity for routes that depend on the link.

As further shown in FIG. 1A, and by reference number 105, the controller platform may receive network data associated with the network. In some implementations, the network data may include topology data associated with the network, path data associated with the network, and/or the like. The topology data may include data identifying the network devices (e.g., data identifying types of the network devices, network identifiers of the network devices, locations of the network devices, hardware and/or software associated with the network devices, other network devices that are adjacent to the network devices, links connected to the network devices, ports associated with the network devices, and/or the like), the links interconnecting the network devices (e.g., data identifying types of the links, protocols used by the links, network devices to which the links are connected, ports associated with the network devices, and/or the like), utilizations of the network devices (e.g., capacities of the network devices, throughputs of the network devices, and/or the like), and/or the like. The path data may include data identifying paths through the network provided by the network devices, sources (e.g., one or more of the network devices, and/or the like) of the paths through the network, destinations (e.g., one or more of the network devices, and/or the like) of the paths through the network, utilizations of the paths through the network (e.g., capacities of the paths, throughputs of the paths, and/or the like), and/or the like.

The controller platform may periodically receive the network data from the network (e.g., at particular time intervals in seconds, minutes, hours, days, and/or the like), may continuously receive the network data from the network, and/or the like. For example, the controller platform may provide, to the network devices, a request for the network data, and the network devices may provide the network data to the controller platform based on the request.

As further shown in FIG. 1A, and by reference number 110, the controller platform may receive (e.g., from a client device) constraints associated with a network plan. In some implementations, the constraints may include a constraint indicating a particular time period associated with determining the network plan for the network, a constraint indicating a failure threshold associated with paths provided through the network by the network devices and the links, a constraint indicating capacities of the links, a constraint indicating possible paths for a traffic demand of the network, a constraint indicating no possible paths for the traffic demand, and/or the like. The constraint indicating the failure threshold may include a threshold count associated with a traffic demand failure by the network plan (e.g., discard a network plan that includes traffic demand failures exceeding the threshold count). The threshold count may be based on capacities of the links, a set of possible paths through the network for a traffic demand, and/or a constant indicating whether there is a certain path for the traffic demand or no possible path for the traffic demand.

Although FIG. 1A shows specific quantities of sites, nodes, network devices, links, and/or the like, in some implementations, the network may include more sites, nodes, network devices, links, and/or the like than depicted in FIG. 1A. For example, the network may include hundreds, thousands, and/or the like of network devices and/or links that generate thousands, millions, billions, etc. of data points. In this way, the controller platform may handle thousands, millions, billions, etc., of data points within a time period (e.g., when determining network plans), and thus may provide "big data" capability.

Figure 1B:
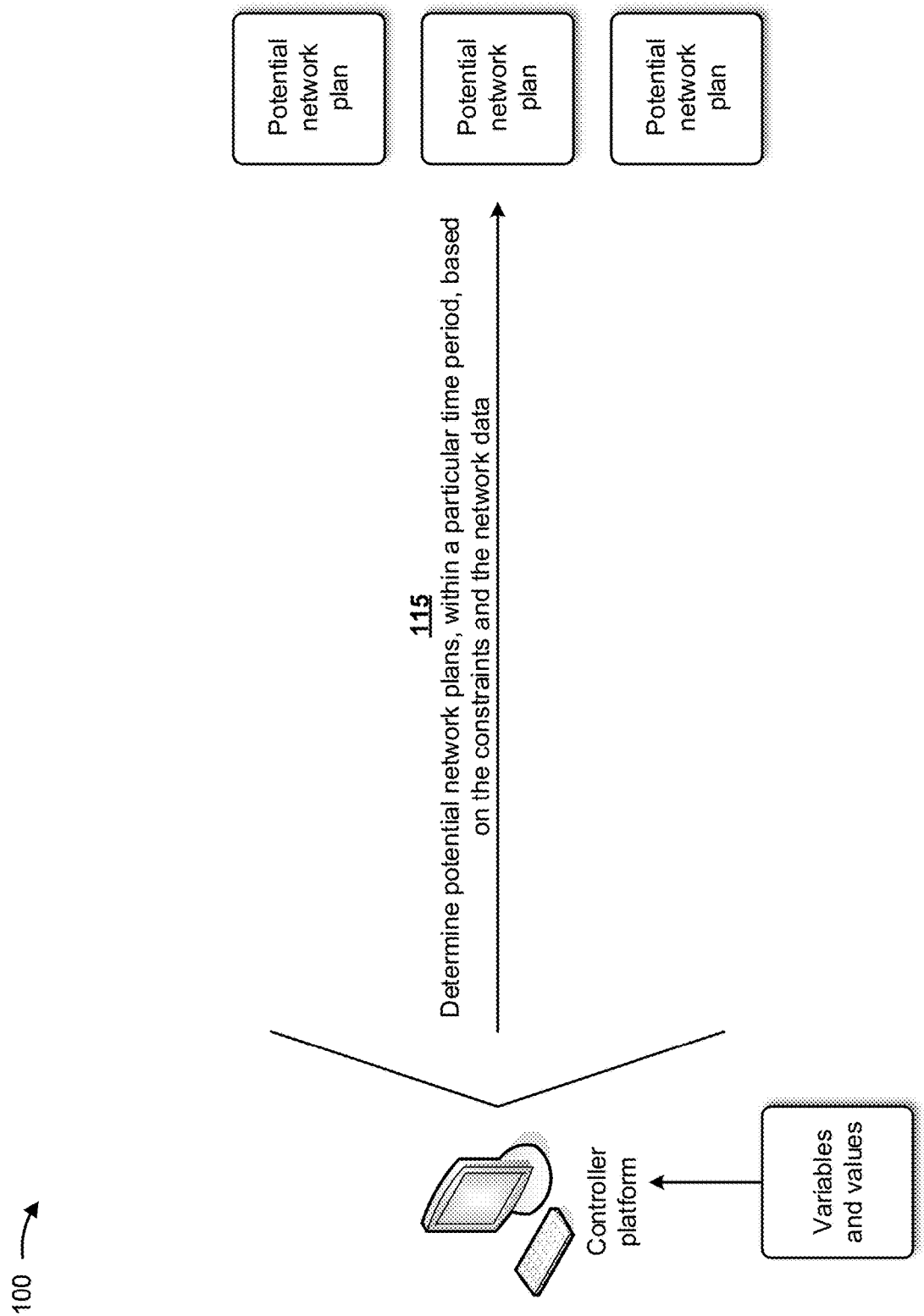

As shown in FIG. 1B, and by reference number 115, the controller platform may determine potential network plans, within a particular time period (e.g., as specified by the constraint indicating the particular time period associated with determining the network plan), based on the constraints and the network data. For example, if the particular time period is small (e.g., in seconds or minutes), the controller platform may determine a first quantity of potential network plans, and if the particular time period is larger (e.g., in minutes or hours), the controller platform may determine a second quantity of potential network plans that is larger than the first quantity of potential network plans. Thus, the particular time period may be utilized (e.g., by a user of the controller platform) to determine resource usage of the controller platform and/or the quantity of potential network plans generated by the controller platform.

In some implementations, the controller platform may assign costs to the potential network plans based on a variety of factors, such as quantities of network devices utilized in the potential network plans, quantities and lengths of links utilized in the potential network plans, utilizations of utilized network devices, utilizations of the links, and/or the like. For example, each factor may be associated with a respective cost (e.g., a link may cost more than a network device), and the controller platform may assign the respective costs to the different factors based on the potential network plan. In some implementations, the controller platform may determine penalties associated with failures of the potential network plans in meeting traffic demands of the network, and may add the penalties to the costs assigned to the potential network plans.

In some implementations, if one of the potential network plans fails to satisfy the constraint indicating the failure threshold (e.g., if the one of the potential network plans includes traffic demand failures that exceed the failure threshold), the controller platform may remove the one of the potential network plans from consideration, may flag the one of the potential network plans, and/or the like.

Figure 1C:
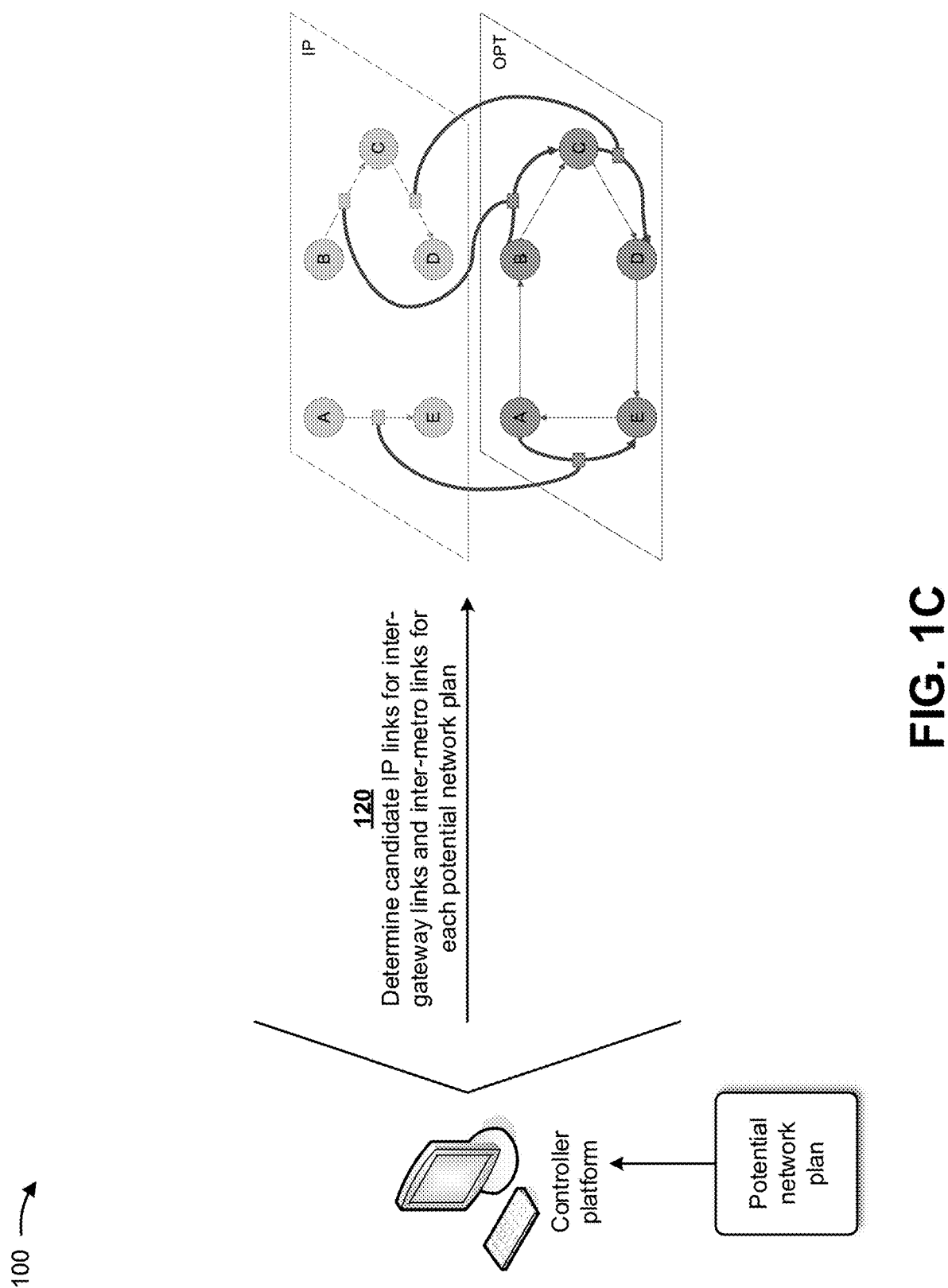

As shown in FIG. 1C, and by reference number 120, the controller platform, when determining the potential network plans, may determine candidate IP links for inter-gateway links (e.g., inter-gateway link AE) and inter-metro links (e.g., inter-metro links BC and CD) for each potential network plan. Each site (e.g., A, B, C, D, and E) may include one multilayer node. In the IP layer, nodes A and E may represent Internet gateways, and nodes B, C, and D may represent access nodes to which customers connect. The traffic flow demands in this example may be 100 Mb/s from X (shown in FIG. 1A) to each of nodes B, C, and D. The IP layer may include links from X to nodes A and E which do not need to be routed in the optical layer. The optical layer may include a metro ring around the five nodes. In this example, the controller platform may determine candidate IP links for inter-gateway links (e.g., links connecting gateways and access nodes that include a single direct one hop route in the optical layer) and for inter-metro links.

Figure 1D:
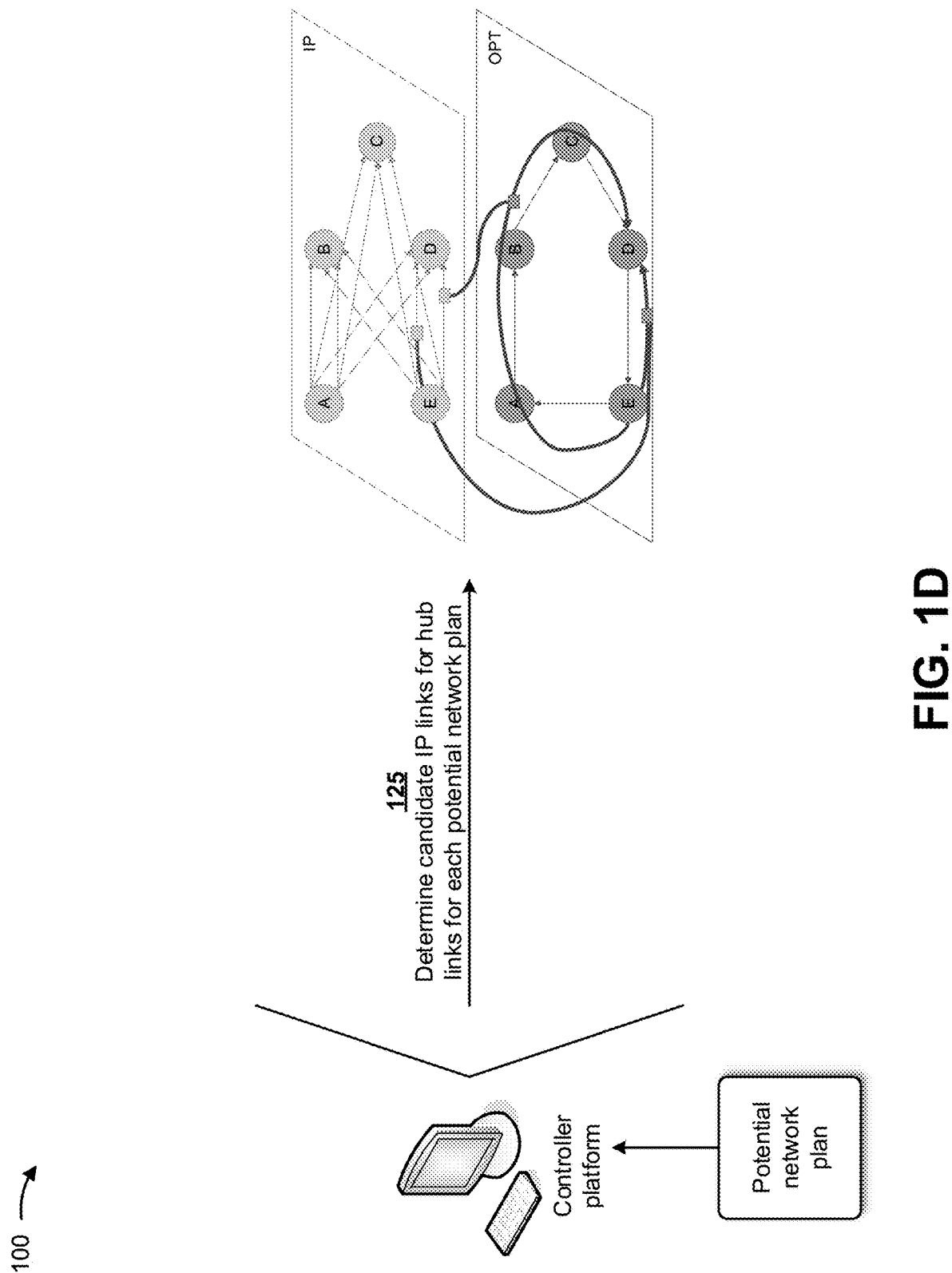

As shown in FIG. 1D, and by reference number 125, the controller platform, when determining the potential network plans, may determine candidate IP links for hub links for each potential network plan. For example, the controller platform may determine hub links between gateway-access node pairs (e.g., two hub links between AB, AC, AD, EB, EC, and ED), where for each gateway-access node pair, two links may include one route clockwise around the metro ring, and another route counterclockwise around the metro ring). The controller platform may associate costs with the hub links (e.g., a cost of three (3) for a first optical layer hop and a cost of two (2) for each additional hop). In this example, the flow layer links may be routed over the IP layer links with the four shortest routes being included in the potential network plan as candidate links.

Figure 1E:
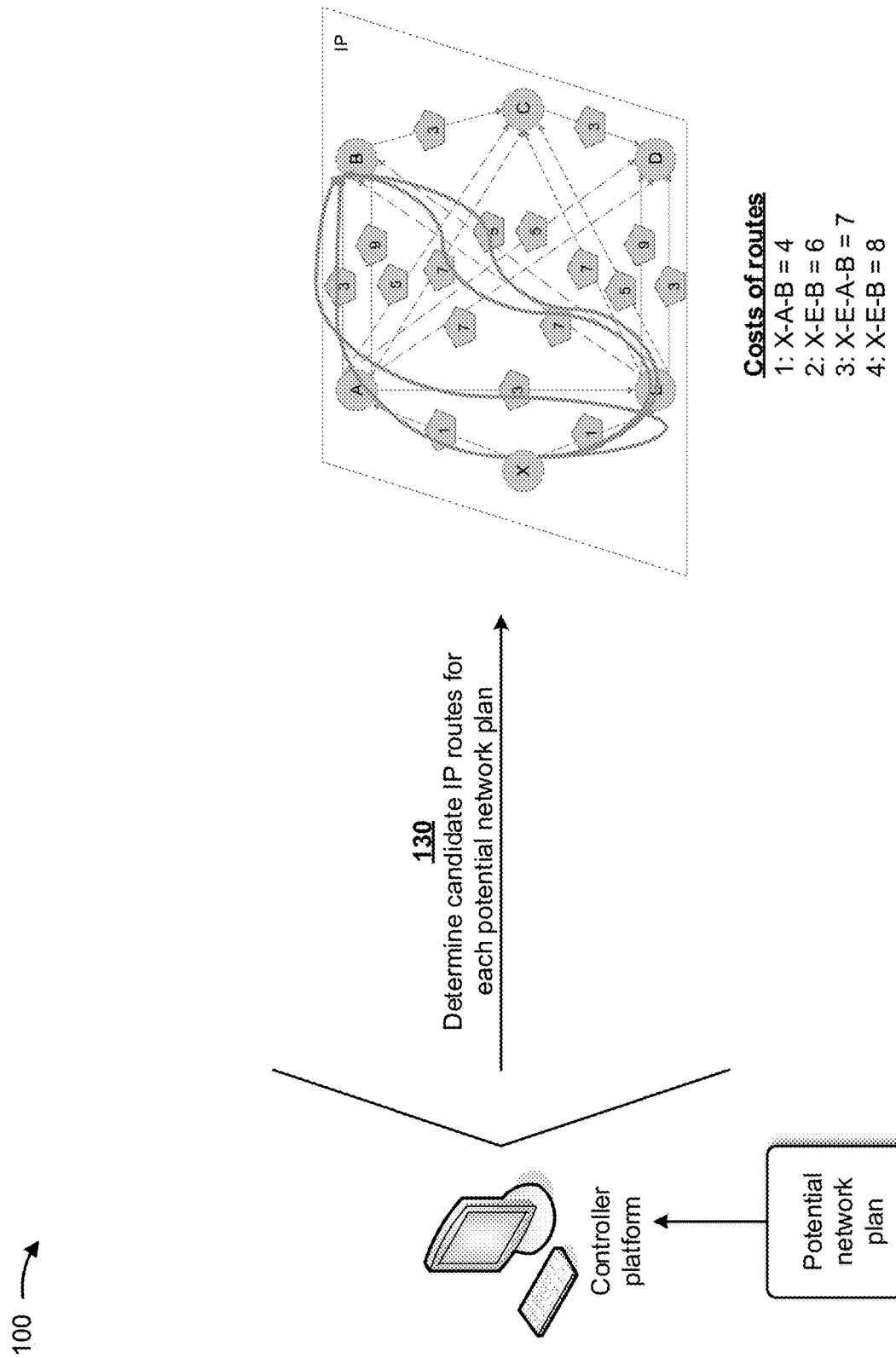

As shown in FIG. 1E, and by reference number 130, the controller platform, when determining the potential network plans, may determine candidate IP paths for each potential network plan. For example, the controller platform may determine a first candidate IP path of X-A-B (e.g., with a cost of four), a second candidate IP path of X-E-B (e.g., with a cost of six), a third candidate IP path of X-E-A-B (e.g., with a cost of seven), and a fourth candidate IP path of X-E-B (e.g., with a cost of eight). Once the candidate IP links and the candidate IP paths are determined, the controller platform may determine the potential network plans based on the candidate IP links and the candidate IP paths. For example, the controller platform may select candidate IP links and candidate IP paths for a potential network plan, and may determine a cost associated with the potential network plan. The controller platform may select different candidate IP links and candidate IP paths in an attempt to reduce the cost associated with the potential network plan.

As shown in FIG. 1F, and by reference number 135, the controller platform may identify a potential network plan, of the potential network plans, that minimizes costs associated with operating the network (e.g., reduces resource usage by the network). In some implementations, the controller platform may compare the costs determined for each of the potential network plans, and may select a potential network plan with a lowest cost. In some implementations, the controller platform may select a potential network plan with a lowest quantity of traffic demand failures, even if the potential network plan does not include the lowest cost. The controller platform may select a potential network plan with a lowest quantity of traffic demand failures and a lowest cost. In some implementations, the controller platform may provide information identifying the potential network plans to a client device, and may receive a selection of a potential network plan from the client device. The controller platform may utilize the potential network plan identified by the selection.

Figure 1G:
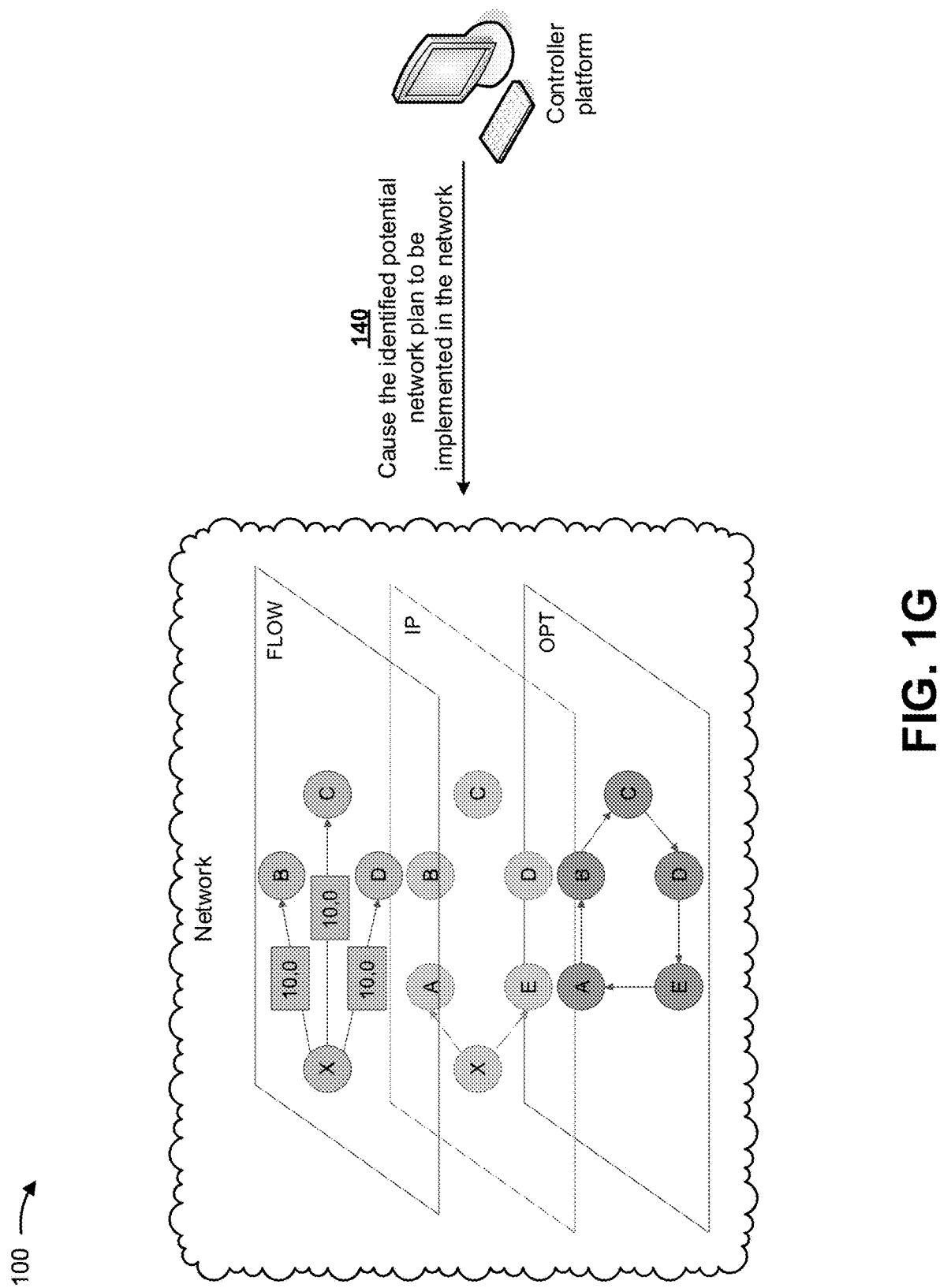

As shown in FIG. 1G, and by reference number 140, the controller platform may cause the identified potential network plan to be implemented in the network. For example, the controller platform may cause the candidate links and the candidate paths selected for the identified network plan to be implemented by the network devices and the links of the network. In some implementations, the controller platform may cause the identified potential network plan to be implemented in the network by providing, to one or more of the network devices, instructions indicating that the one or more network devices, and the links associated with the one or more network devices, are to implement the identified potential network plan. The one or more network devices may receive the instructions and may implement the identified potential network plan based on the instructions. For example, the controller device may provide, to three network devices, instructions indicating that the three network devices (e.g., and two links provided between the three network devices) are to reserve bandwidth for a traffic demand. The three network devices may receive the instructions and may reserve the bandwidth for the traffic demand based on the instructions.

In some implementations, network devices may receive instructions indicating that the network devices, and the links associated with the network devices, are to implement the identified potential network plan, and may configure forwarding and routing tables of the network devices with information associated with the identified network plan (e.g., based on the instructions).

In some implementations, the controller platform may receive additional network data from the network based on causing the identified potential network plan to be implemented in the network, and may modify the identified potential network plan based on the additional network data to generate a modified potential network plan. For example, if the additional network data indicates that a portion of the network is failing to manage a new traffic demand, the controller platform may modify the identified potential network plan to manage the new traffic demand. The controller platform may then cause the modified potential network plan to be implemented in the network, as described above.

In some implementations, the controller platform may generate multilayer and interactive user interfaces associated with the potential network plans for the network. For example, the controller platform may utilize information associated with the potential network plans to generate the multilayer and interactive user interfaces. The user interfaces may include direct manipulation interfaces with graphical objects in a view representing a selected potential network plan. The user interfaces may include a network map that based around sites represented as icons at points on five x-y planes (e.g., a flow layer link plane, an IP layer route plane, an IP layer link plane, an optical layer route plane, and an optical layer link plane). Each site may represent a group of nodes provided at the site. Lines may connect the sites in each plane and may summarize connections between the nodes provided at the sites. In the x-y planes, the lines may represent flow links, IP routes, IP links, optical routes, and optical links. The user interfaces may support selection of a site to show and hide the nodes provided at the selected site and the links or routes incident on those nodes. This may be done on a combination of any or all of the x-y planes. Lines representing routes and links may be bowed when there is more than one route/link between a same pair of nodes on a same Layer to differentiate between them. For routes and links where a specific traffic option has not been selected, a visual representation may utilize markings (e.g., colors and line widths) to suggest a range of traffic options under consideration.

Site coordinates in the network map may be geographic latitude and/or longitude or may be logical to spread the sites out with an even distribution on the network map to minimize line crossing, maximize clarity and ease of understanding the network structure, and/or the like. Flow layer links may be marked (e.g., colored and sized) to indicate an intensity of a traffic demand between the nodes connected by the flow layer links. IP layer and optical layer routes may be marked (e.g., colored and sized) to indicate a fraction of an associated traffic demand carried by the routes (e.g., unused routes may include special markings, such as dashed lines). IP layer and optical layer links may be marked (e.g., colored) to indicate utilization of the links (e.g., with options for normal case or worst case under failure, and unused links may include special markings, such as dashed lines). The user interfaces support creating, editing, and deleting all types of objects. The user interfaces also support selection of any object to expand or collapse details of relationships associated with the selected object. The relationships supported for expansion and collapse may include expanding a site to show nodes provided at the site, expanding a link to show routes that carry the link, expanding a route to show links in the route, expanding a link to show routes that use the link, and/or the like. The network map may support moving a view around in three dimensional space with gestures to translate, scale, and rotate the view.

Figure 1H:
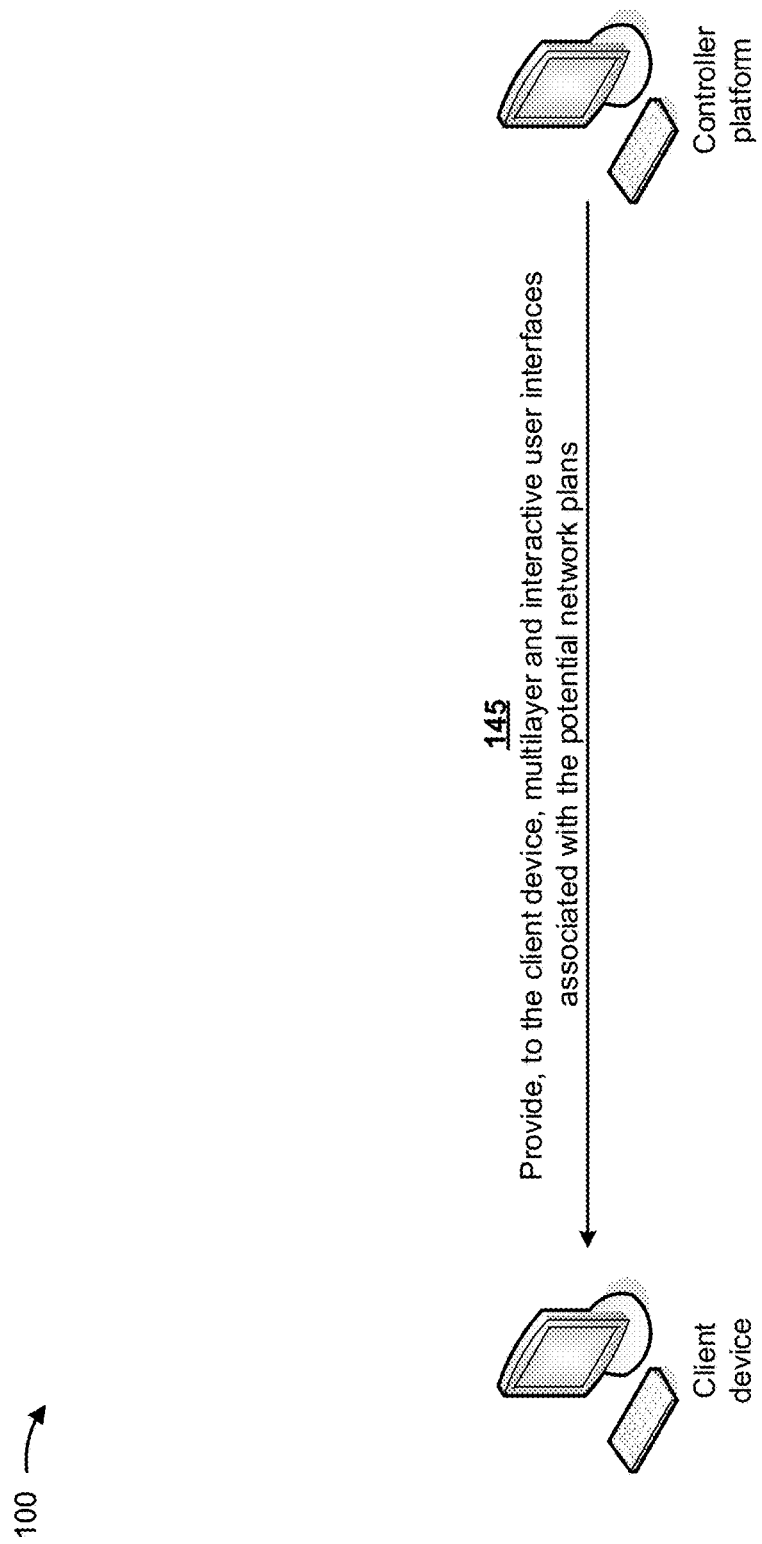

As shown in FIG. 1H, and by reference number 145, the controller platform may provide, to a client device, multilayer and interactive user interfaces associated with the potential network plans for the network. The client device may receive the multilayer and interactive user interfaces associated with the potential network plans and may provide the multilayer and interactive user interfaces associated with the potential network plans for display. The multilayer and interactive user interfaces may enable a user of the client device to view features associated with the potential network plans, to see a graphical representation of a selected potential network plan, to select a potential network plan for implementation, and/or the like, as described below.

Figure 1I:
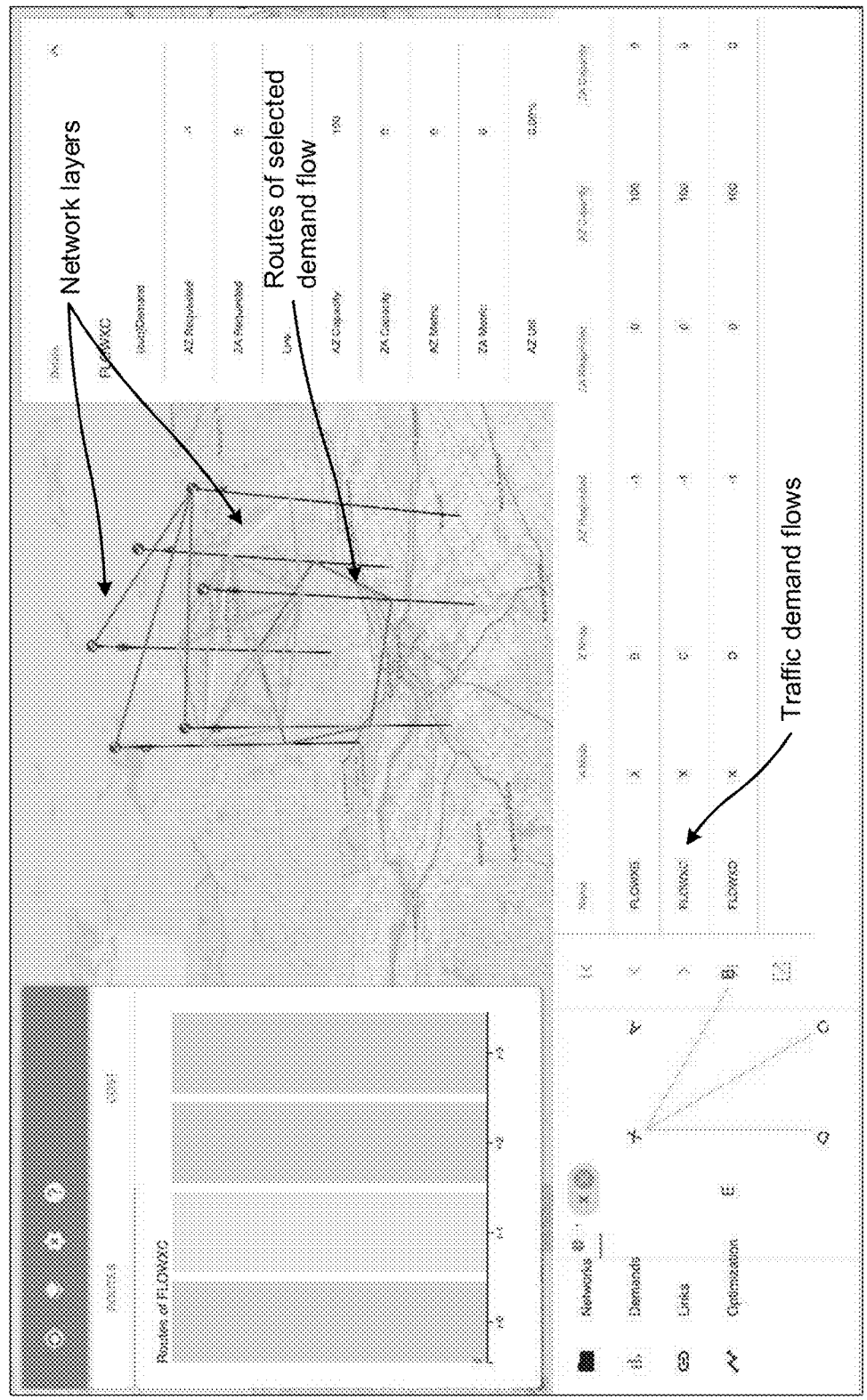

As shown in FIG. 1I, the multilayer and interactive user interfaces may include a multilayer and interactive user interface that provides information identifying the potential network plans. A user of the client device may utilize the multilayer and interactive user interface to select one of the potential network plans. As further shown, the multilayer and interactive user interface may display a graphical representation (e.g., a three-dimensional view) of network layers associated with the selected one of the potential network plans. For example, the graphical representation of the selected one of the potential network plans may include graphical representations of an IP layer and an optical layer of the selected one of the potential network plans. The user of the client device may view the graphical representation from multiple angles and multiple orientations (e.g., via movement of a mouse of the client device, via gestures with a touchpad of the client device, via gestures with a touchscreen of the client device, and/or the like) in order to fully visualize the network layers associated with the selected one of the potential network plans. As further shown, the multilayer and interactive user interface may display traffic demand flows associated with the selected one of the potential network plans and may enable the user of the client device to select a traffic demand flow (e.g., via a mouse gesture, a touchpad or touchscreen gesture, and/or the like). Once a traffic demand flow is selected, the multilayer and interactive user interface may highlight routes of the selected one of the network plans (e.g., in the graphical representation) associated with the selected traffic demand flow. The selected traffic demand flow may include information identifying a source node (e.g., A Node) of the traffic demand flow, a destination node (e.g., Z Node) of the traffic flow demand, whether the traffic demand flow is a unidirectional or bidirectional, a capacity of the traffic demand flow, and/or the like.

Figure 1J:
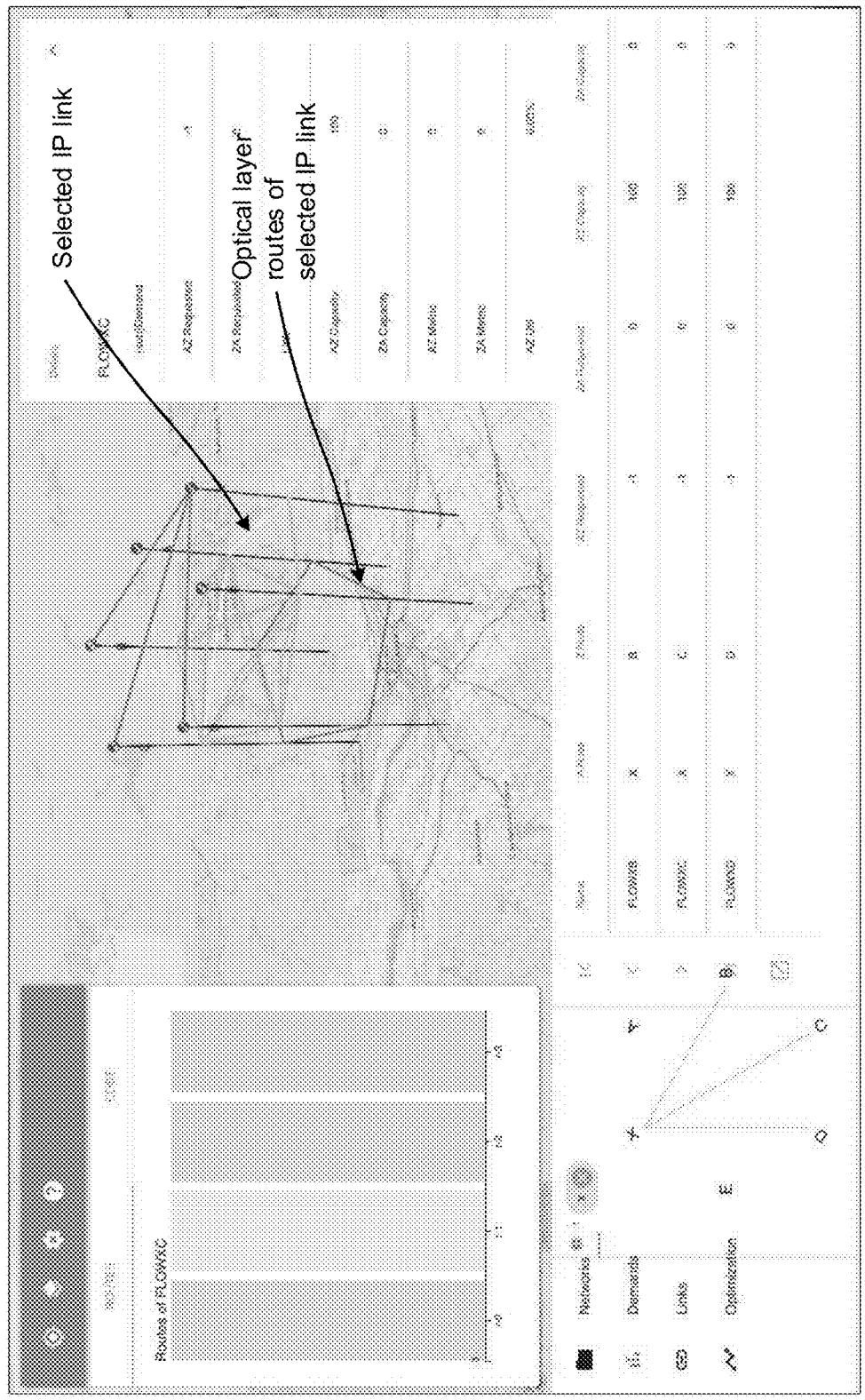

As shown in FIG. 1J, the multilayer and interactive user interfaces may include a multilayer and interactive user interface that provides information identifying a selected potential network plan. A user of the client device may utilize the multilayer and interactive user interface to select one of the potential network plans (e.g., via a mouse gesture, a touchpad or touchscreen gesture, and/or the like). As further shown, the multilayer and interactive user interface may display a graphical representation (e.g., a three-dimensional view) of network layers associated with the selected one of the potential network plans. In some implementations, the user of the client device may utilize the graphical representation to select a link of a flow layer of the selected one of the potential network plans (e.g., via a mouse gesture, a touchpad or touchscreen gesture, and/or the like). When the user selects the link of the flow layer, the graphical representation of the selected link of the flow layer may be highlighted and a graphical representation of routes of an IP layer of the selected one of the potential network plans may be automatically generated and highlighted. The routes of the IP layer may correspond to the link of the flow layer.

Figure 1K:
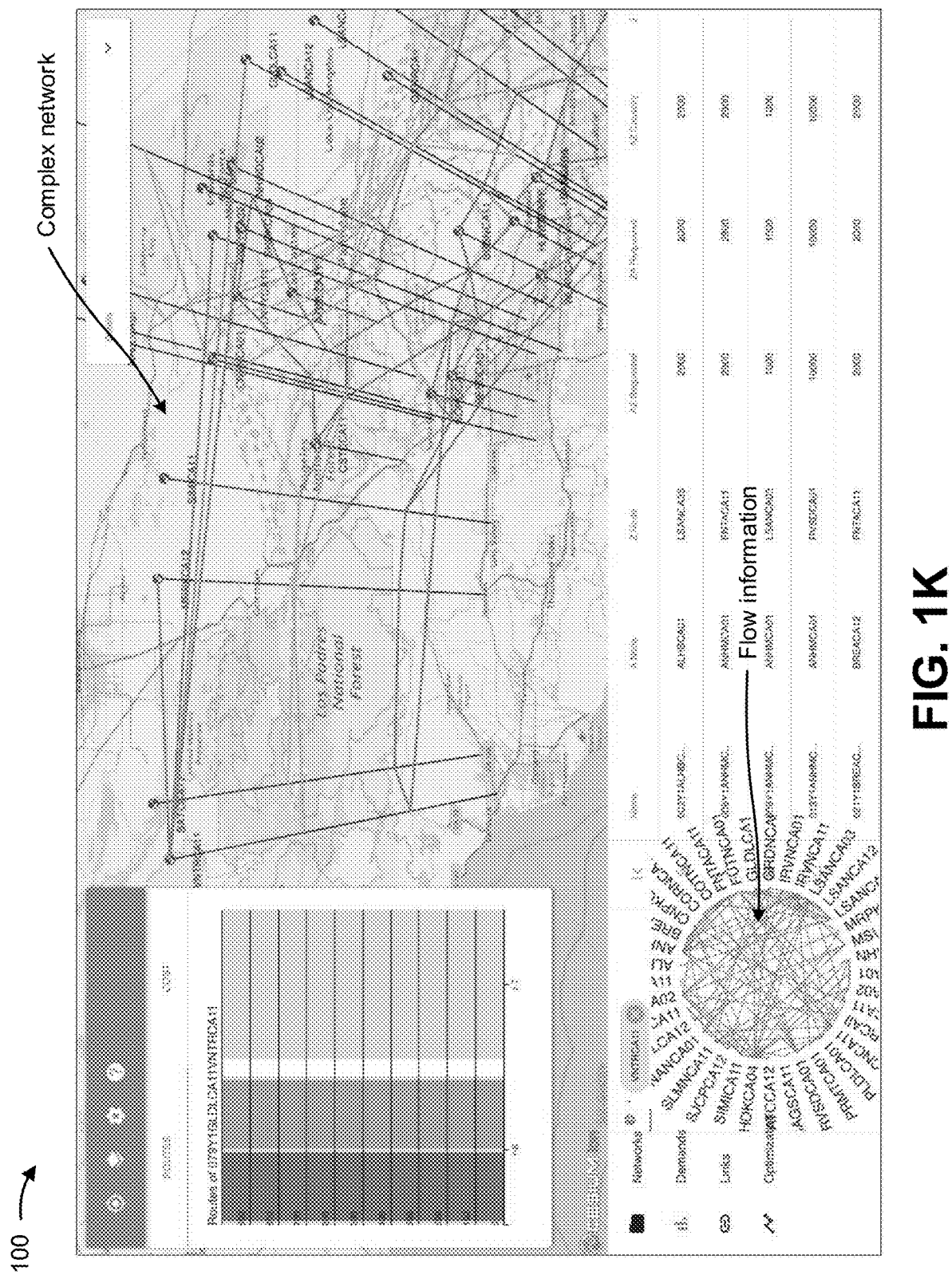
Figure 1L:
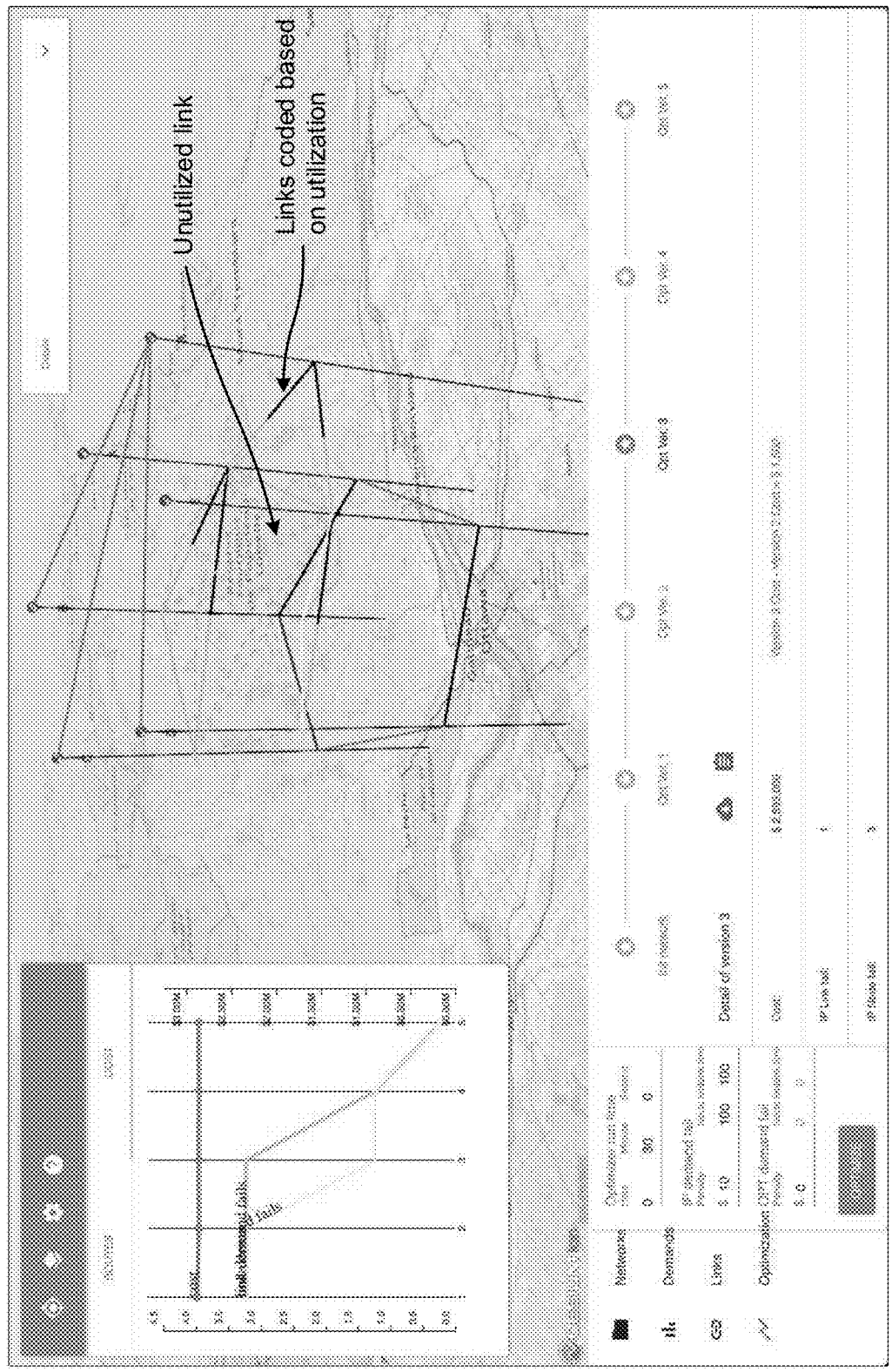

As shown in FIG. 1K, the multilayer and interactive user interfaces may include a multilayer and interactive user interface that provides information identifying a complex potential network plan. A user of the client device may utilize the multilayer and interactive user interface to select the complex potential network plans (e.g., via a mouse gesture, a touchpad or touchscreen gesture, and/or the like). As further shown, the multilayer and interactive user interface may display a graphical representation (e.g., a three-dimensional view) of network layers associated with the selected one of the complex potential network plans. The user of the client device may view the graphical representation from multiple angles and multiple orientations (e.g., via movement of a mouse of the client device, via gestures with a touchpad of the client device, via gestures with a touchscreen of the client device, and/or the like) in order to fully visualize and understand the network layers associated with the selected one of the complex potential network plans. In some implementations, the multilayer and interactive user interface may include information identifying costs associated with the selected one of complex potential network plans. In some implementations, the multilayer and interactive user interface shown in FIG. 1K may be viewed from a surface (e.g., looking upward at the graphical representation, via movement of a mouse of the client device, via gestures with a touchpad of the client device, via gestures with a touchscreen of the client device, and/or the like), and may enable the user of the client device to navigate routes in the IP layer that depend on links in the optical layer. The multilayer and interactive user interfaces may provide information identifying sites associated with the complex network As shown in FIG. 1L, the multilayer and interactive user interfaces may include a multilayer and interactive user interface that provides information identifying the potential network plans. A user of the client device may utilize the multilayer and interactive user interface to select one of the potential network plans. As further shown, the multilayer and interactive user interface may display a graphical representation (e.g., a three-dimensional view) of network layers associated with the selected one of the potential network plans. In some implementations, the graphical representation may mark unutilized links (e.g., via dashed lines) in the selected one of the potential network plans, may code (e.g., color code) links provided in the IP layer based on utilization, and/or the like.

In some implementations, the multilayer and interactive user interfaces may include information that enables input of a value for node and link failures associated with a selected one of the potential network plans. The value for the node and link failures may adjust a time associated with determining a cost for the selected one of the potential network plans. In some implementations, the multilayer and interactive user interfaces may include a graphical animation depicting differences between a selected two of the potential network plans. The graphical animation may provide views of the selected two of the potential network plans from multiple angles and multiple orientations.

In some implementations, the controller platform may receive, via the multilayer and interactive user interface, selections of portions of one of the network plans, may perform multiple optimizations, in parallel, on the portions of the one of the plurality of network plans, and may provide, to the client device and via the multilayer and interactive user interface, results of the multiple optimizations. In some implementations, the controller platform may receive, from the client device, input that identifies a particular potential network plan of the potential network plans, and may cause the particular network plan to be implemented by the network devices.

In some implementations, the multilayer and interactive user interfaces may include a graphical representation of a first one of the potential network plans, and an animation depicting differences when transitioning from the first one of the potential network plans to a second one of the potential network plans. In some implementations, the multilayer and interactive user interfaces may include information that permits a user of the client device to change one or more parts of one of the potential network plans. In some implementations, the multilayer and interactive user interfaces are provided to the client device before the identified potential network plan is implemented in the network. In this way, the user of the network device may view, manipulate, and/or the like the potential network plans and may select the identified potential network plan for implementation in the network.

In this way, the controller platform may provide multilayer and interactive user interfaces that provide a clear understanding of a network plan and prevent implementation of sub-optimal network plans. This, in turn, conserves computing resources (e.g., processing resources, memory resources, and/or the like), networking resources, and/or the like that would otherwise be wasted in identifying a sub-optimal network plan, correcting inefficient network operation caused by the sub-optimal network plan, correcting inefficient utilization of network resources caused by the sub-optimal network plan, and/or the like. Furthermore, implementations described herein use a rigorous, computerized process to perform tasks that were not previously performed. For example, currently there does not exist a technique that provides multilayer and interactive user interfaces for displaying features of an optimized network plan.

As indicated above, FIGS. 1A-1L are provided merely as examples. Other examples may differ from what is described with regard to FIGS. 1A-1L.

Figure 2:
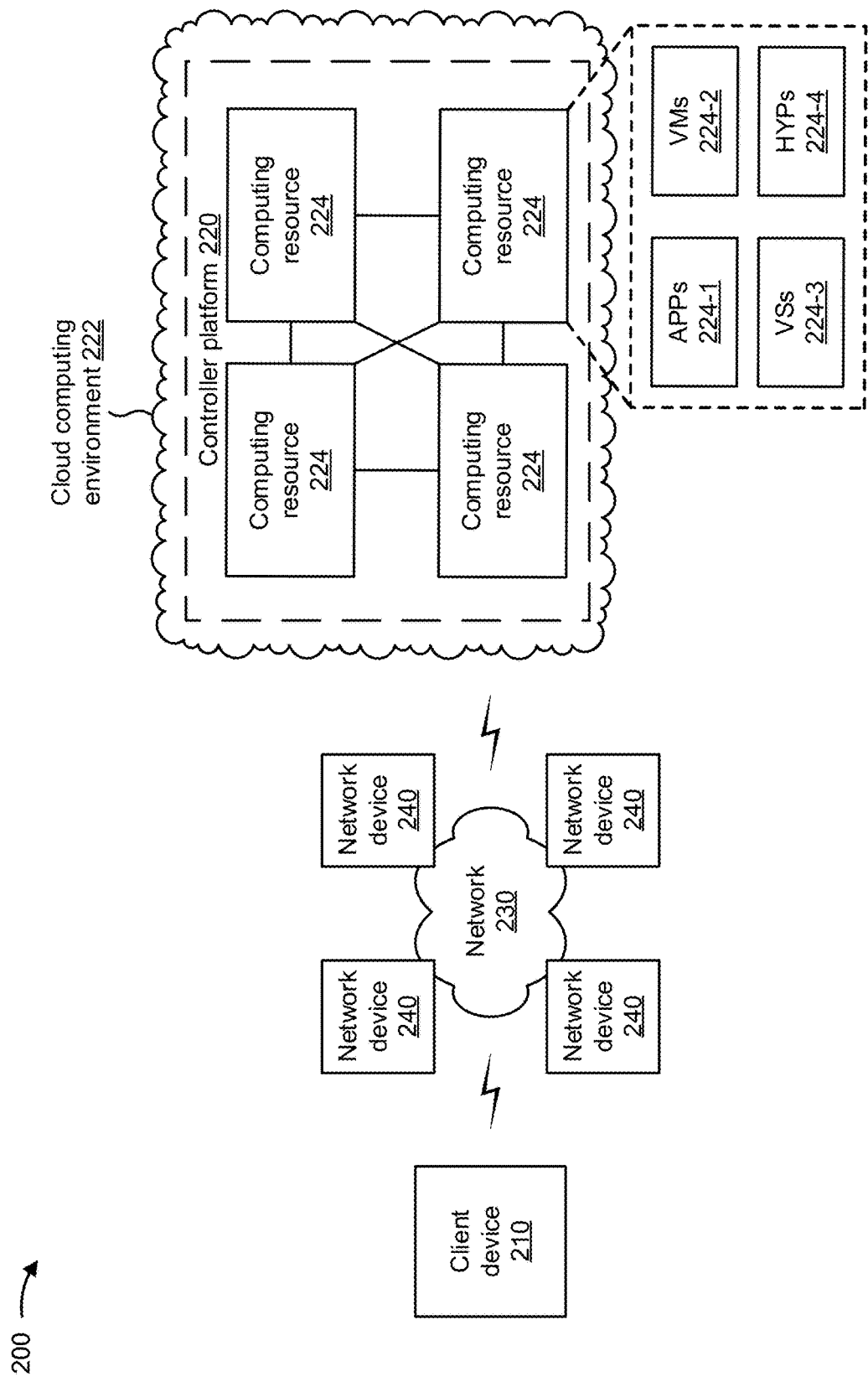
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include a client device 210, a controller platform 220, a network 230, and a group of network devices 240 of network 230. Devices of environment 200 may interconnect via wired connections, wireless connections, or a combination of wired and wireless connections.

Client device 210 includes one or more devices capable of receiving, generating, storing, processing, and/or providing information, such as information described herein. For example, client device 210 may include a mobile phone (e.g., a smart phone, a radiotelephone, etc.), a laptop computer, a tablet computer, a desktop computer, a handheld computer, a gaming device, a wearable communication device (e.g., a smart watch, a pair of smart glasses, a heart rate monitor, a fitness tracker, smart clothing, smart jewelry, a head mounted display, etc.), or a similar type of device. In some implementations, client device 210 may receive information from and/or transmit information to controller platform 220, via network 230 and network devices 240. In some implementations, client device 210 may receive network traffic from and/or may provide network traffic to other client devices 210 via network 230 (e.g., by routing packets using network devices 240 as intermediaries).

Controller platform 220 includes one or more devices that provide multilayer and interactive user interfaces for displaying features of an optimized network plan. In some implementations, controller platform 220 may be designed to be modular such that certain software components may be swapped in or out depending on a particular need. As such, controller platform 220 may be easily and/or quickly reconfigured for different uses. In some implementations, controller platform 220 may receive information from and/or transmit information to one or more client devices 210 and/or network devices 240.

In some implementations, as shown, controller platform 220 may be hosted in a cloud computing environment 222. Notably, while implementations described herein describe controller platform 220 as being hosted in cloud computing environment 222, in some implementations, controller platform 220 may not be cloud-based (i.e., may be implemented outside of a cloud computing environment) or may be partially cloud-based.

Cloud computing environment 222 includes an environment that hosts controller platform 220. Cloud computing environment 222 may provide computation, software, data access, storage, etc., services that do not require end-user knowledge of a physical location and configuration of system(s) and/or device(s) that hosts controller platform 220. As shown, cloud computing environment 222 may include a group of computing resources 224 (referred to collectively as "computing resources 224" and individually as "computing resource 224").

Computing resource 224 includes one or more personal computers, workstation computers, mainframe devices, or other types of computation and/or communication devices. In some implementations, computing resource 224 may host controller platform 220. The cloud resources may include compute instances executing in computing resource 224, storage devices provided in computing resource 224, data transfer devices provided by computing resource 224, etc. In some implementations, computing resource 224 may communicate with other computing resources 224 via wired connections, wireless connections, or a combination of wired and wireless connections.

As further shown in FIG. 2, computing resource 224 includes a group of cloud resources, such as one or more applications ("APPs") 224-1, one or more virtual machines ("VMs") 224-2, virtualized storage ("VSs") 224-3, one or more hypervisors ("HYPs") 224-4, and/or the like.

Application 224-1 includes one or more software applications that may be provided to or accessed by client device 210. Application 224-1 may eliminate a need to install and execute the software applications on client device 210 and/or network devices 240. For example, application 224-1 may include software associated with controller platform 220 and/or any other software capable of being provided via cloud computing environment 222. In some implementations, one application 224-1 may send/receive information to/from one or more other applications 224-1, via virtual machine 224-2.

Virtual machine 224-2 includes a software implementation of a machine (e.g., a computer) that executes programs like a physical machine. Virtual machine 224-2 may be either a system virtual machine or a process virtual machine, depending upon use and degree of correspondence to any real machine by virtual machine 224-2. A system virtual machine may provide a complete system platform that supports execution of a complete operating system ("OS"). A process virtual machine may execute a single program and may support a single process. In some implementations, virtual machine 224-2 may execute on behalf of a user (e.g., a user of client device 210 or an operator of controller platform 220), and may manage infrastructure of cloud computing environment 222, such as data management, synchronization, or long-duration data transfers.

Virtualized storage 224-3 includes one or more storage systems and/or one or more devices that use virtualization techniques within the storage systems or devices of computing resource 224. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 224-4 may provide hardware virtualization techniques that allow multiple operating systems (e.g., "guest operating systems") to execute concurrently on a host computer, such as computing resource 224. Hypervisor 224-4 may present a virtual operating platform to the guest operating systems and may manage the execution of the guest operating systems. Multiple instances of a variety of operating systems may share virtualized hardware resources.

Network 230 includes one or more wired and/or wireless networks. For example, network 230 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, and/or the like, and/or a combination of these or other types of networks.

Network device 240 includes one or more devices capable of receiving, processing, storing, routing, and/or providing traffic (e.g., a packet, other information or metadata, and/or the like) in a manner described herein. For example, network device 240 may include a router, such as a label switching router (LSR), a label edge router (LER), an ingress router, an egress router, a provider router (e.g., a provider edge router, a provider core router, etc.), a virtual router, and/or the like. Additionally, or alternatively, network device 240 may include a gateway, a switch, a firewall, a hub, a bridge, a reverse proxy, a server (e.g., a proxy server, a cloud server, a data center server, etc.), a load balancer, and/or a similar device. In some implementations, network device 240 may be a physical device implemented within a housing, such as a chassis. In some implementations, network device 240 may be a virtual device implemented by one or more computer devices of a cloud computing environment or a data center. In some implementations, a group of network devices 240 may be a group of data center nodes that are used to route traffic flow through network 230.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
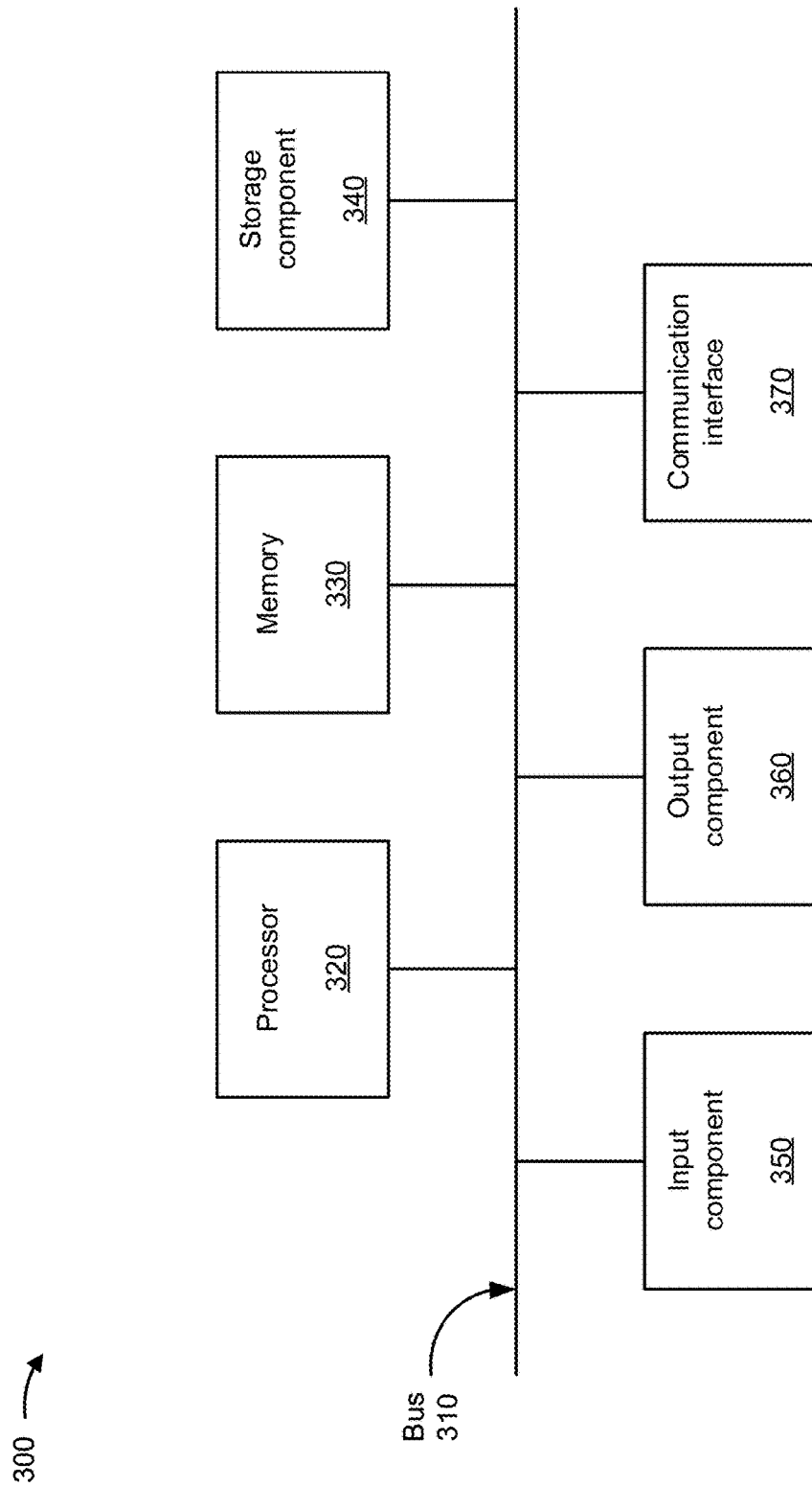
FIG. 3 is a diagram of example components of one or more devices of FIG. 2.

FIG. 3 is a diagram of example components of a device 300. Device 300 may correspond to client device 210, controller platform 220, computing resource 224, and/or network device 240. In some implementations, client device 210, controller platform 220, computing resource 224, and/or network device 240 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random-access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid-state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, and/or the like.

Device 300 may perform one or more processes described herein. Device 300 may perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
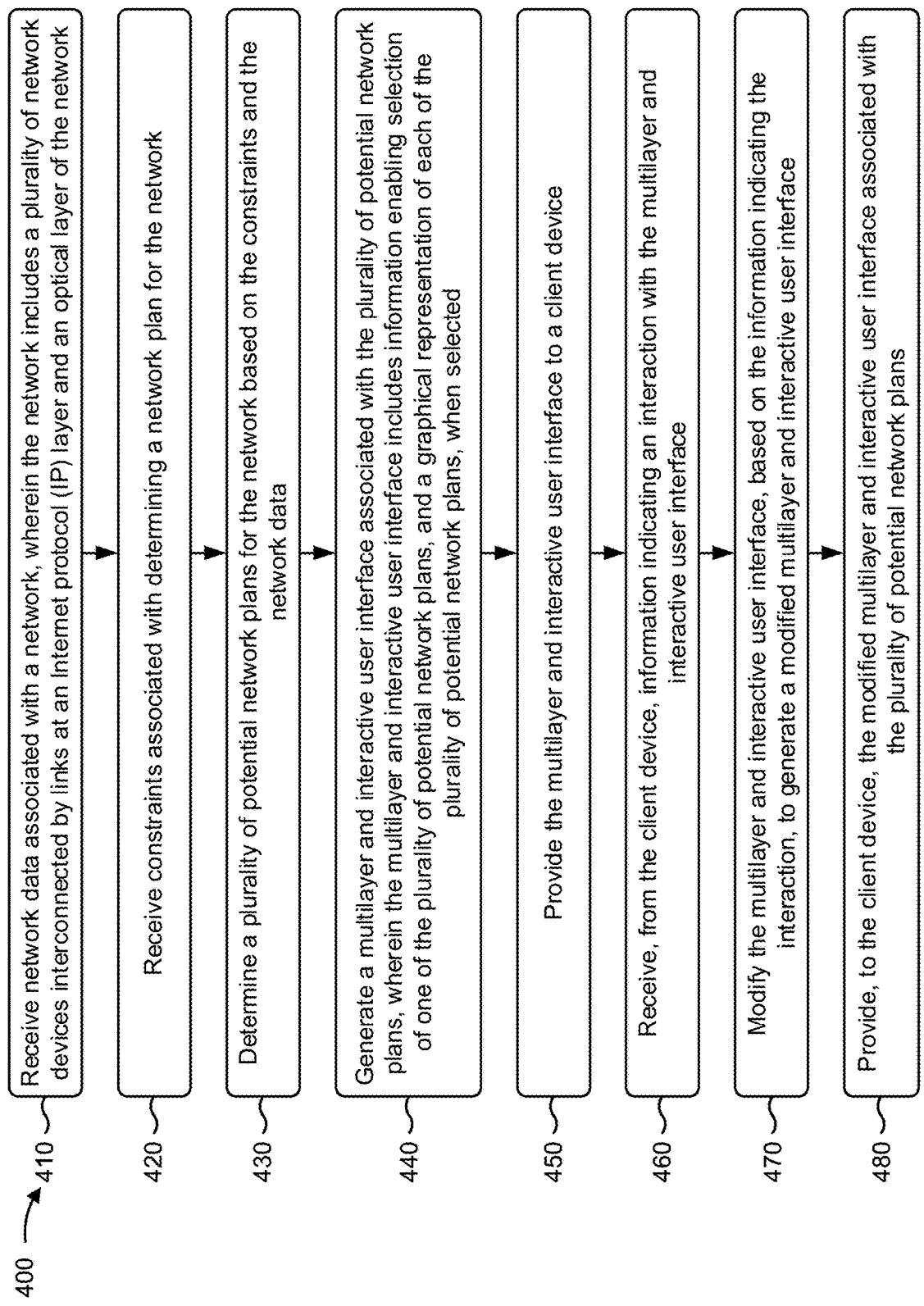
FIGS. 4-6 are flow charts of example processes for providing multilayer and interactive user interfaces for displaying features of an optimized network plan.

FIG. 4 is a flow chart of an example process 400 for providing multilayer and interactive user interfaces for displaying features of an optimized network plan. In some implementations, one or more process blocks of FIG. 4 may be performed by a controller platform (e.g., controller platform 220). In some implementations, one or more process blocks of FIG. 4 may be performed by another device or a group of devices separate from or including the controller platform, such as a client device (e.g., client device 210) and/or a network device (e.g., network device 240).

As shown in FIG. 4, process 400 may include receiving network data associated with a network, wherein the network includes a plurality of network devices interconnected by links at an Internet protocol (IP) layer and an optical layer of the network (block 410). For example, the controller platform (e.g., using computing resource 224, processor 320, communication interface 370, and/or the like) may receive network data associated with a network, as described above in connection with FIGS. 1A-3. In some aspects, the network may include a plurality of network devices interconnected by links at an Internet protocol (IP) layer and an optical layer of the network.

As further shown in FIG. 4, process 400 may include receiving constraints associated with determining a network plan for the network (block 420). For example, the controller platform (e.g., using computing resource 224, processor 320, communication interface 370, and/or the like) may receive constraints associated with determining a network plan for the network, as described above in connection with FIGS. 1A-3.

As further shown in FIG. 4, process 400 may include determining a plurality of potential network plans for the network based on the constraints and the network data (block 430). For example, the controller platform (e.g., using computing resource 224, processor 320, memory 330, and/or the like) may determine a plurality of potential network plans for the network based on the constraints and the network data, as described above in connection with FIGS. 1A-3.

As further shown in FIG. 4, process 400 may include generating a multilayer and interactive user interface associated with the plurality of potential network plans, wherein the multilayer and interactive user interface includes information enabling selection of one of the plurality of potential network plans and a graphical representation of each of the plurality of potential network plans, when selected (block 440). For example, the controller platform (e.g., using computing resource 224, processor 320, storage component 340, and/or the like) may generate a multilayer and interactive user interface associated with the plurality of potential network plans, as described above in connection with FIGS. 1A-3. In some aspects, the multilayer and interactive user interface may include information enabling selection of one of the plurality of potential network plans and a graphical representation of each of the plurality of potential network plans, when selected.

As further shown in FIG. 4, process 400 may include providing the multilayer and interactive user interface to a client device (block 450). For example, the controller platform (e.g., using computing resource 224, processor 320, memory 330, communication interface 370, and/or the like) may provide the multilayer and interactive user interface to a client device, as described above in connection with FIGS. 1A-3.

As further shown in FIG. 4, process 400 may include receiving, from the client device, information indicating an interaction with the multilayer and interactive user interface (block 460). For example, the controller platform (e.g., using computing resource 224, processor 320, communication interface 370s and/or the like) may receive, from the client device, information indicating an interaction with the multilayer and interactive user interface, as described above in connection with FIGS. 1A-3.

As further shown in FIG. 4, process 400 may include modifying the multilayer and interactive user interface, based on the information indicating the interaction, to generate a modified multilayer and interactive user interface associated with the plurality of potential network plans (block 470). For example, the controller platform (e.g., using computing resource 224, processor 320, memory 330, and/or the like) may modify the multilayer and interactive user interface, based on the information indicating the interaction, to generate a modified multilayer and interactive user interface associated with the plurality of potential network plans, as described above in connection with FIGS. 1A-3.

As further shown in FIG. 4, process 400 may include providing, to the client device, the modified multilayer and interactive user interface associated with the plurality of potential network plans (block 480). For example, the controller platform (e.g., using computing resource 224, processor 320, communication interface 370, and/or the like) may provide, to the client device, the modified multilayer and interactive user interface associated with the plurality of potential network plans, as described above in connection with FIGS. 1A-3.

Process 400 may include additional implementations, such as any single implementation or any combination of implementations described below and/or in connection with one or more other processes described elsewhere herein.

In some implementations, the controller platform may identify a potential network plan, of the plurality of potential network plans, that minimizes costs associated with operating the network, and may cause the identified potential network plan to be implemented in the network by the plurality of network devices.

In some implementations, the multilayer and interactive user interface may include a graphical representation of a selected one of the plurality of potential network plans. The graphical representation may be capable of providing views of the selected one of the plurality of network plans from multiple angles and multiple orientations. The graphical representation may include graphical representations of an IP layer and an optical layer of the selected one of the plurality of potential network plans, and graphical representations of routes associated with a selected traffic demand flow.

In some implementations, the multilayer and interactive user interface may include a graphical representation of a selected one of the plurality of potential network plans, and a graphical representation of a selected link of an IP layer of the selected one of the plurality of potential network plans. The graphical representation of the selected link of the IP layer may be highlighted when selected. The multilayer and interactive user interface may include a graphical representation of a route of an optical layer of the selected one of the plurality of potential network plans. The route of the optical layer may correspond to the link of the IP layer and may be automatically generated and highlighted when the link of the IP layer is selected.

In some implementations, the multilayer and interactive user interface may include information identifying the plurality of potential network plans, information identifying costs associated with the plurality of potential network plans, and graphical representations of links provided in an IP layer of a selected one of the plurality of potential network plans. The graphical representations of the links provided in the IP layer may be coded based on utilization and are marked if unutilized.

In some implementations, the multilayer and interactive user interface may include information enabling input of a value for node and link failures associated with a selected one of the plurality of potential network plans. The value for the node and link failures may adjust a time associated with determining a cost for the selected one of the plurality of potential network plans.

In some implementations, the multilayer and interactive user interface may include a graphical animation depicting differences between a selected two of the plurality of potential network plans. The graphical animation may be capable of providing views of the selected two of the plurality of potential network plans from multiple angles and multiple orientations.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
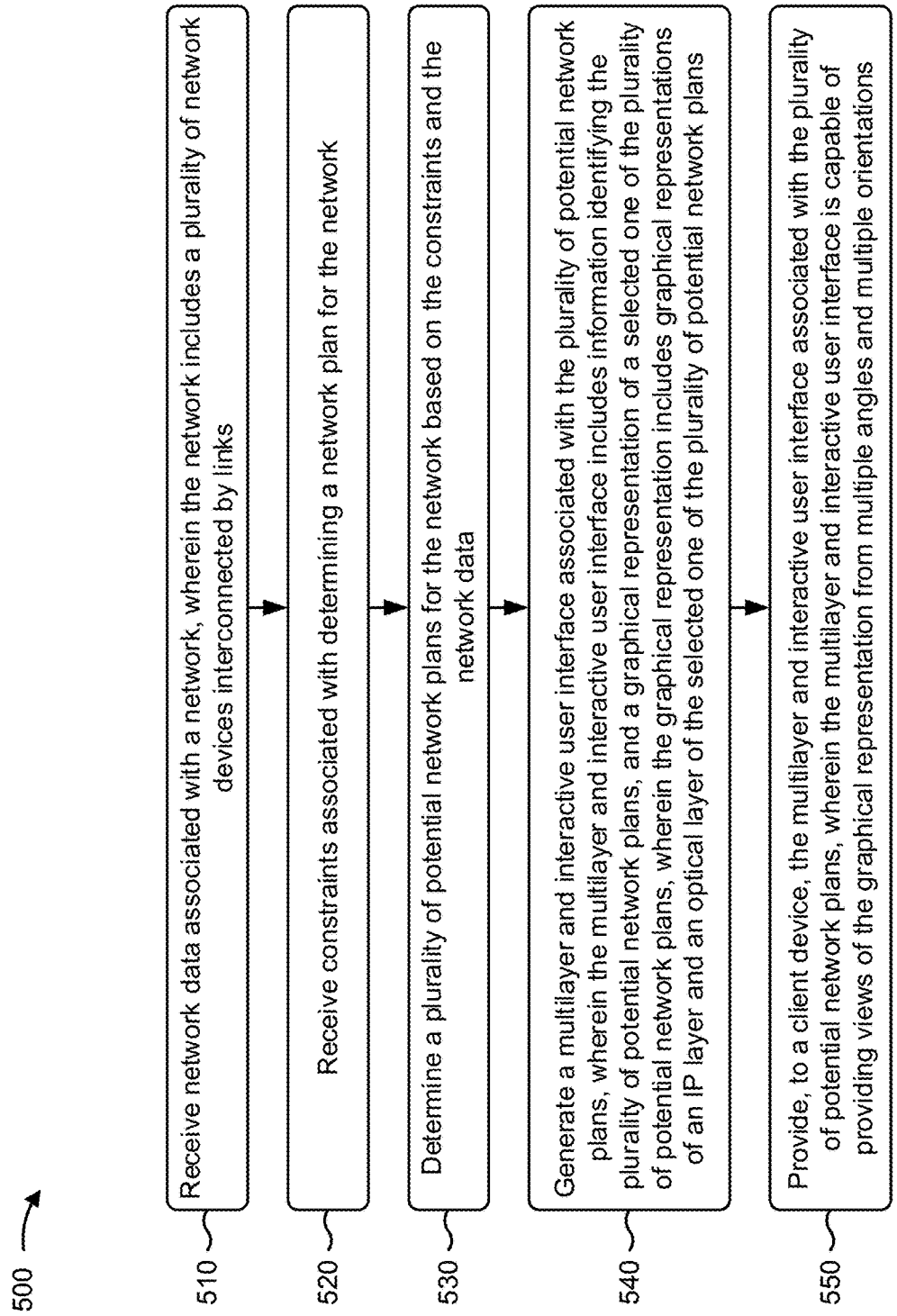

FIG. 5 is a flow chart of an example process 500 for providing multilayer and interactive user interfaces for displaying features of an optimized network plan. In some implementations, one or more process blocks of FIG. 5 may be performed by a controller platform (e.g., controller platform 220). In some implementations, one or more process blocks of FIG. 5 may be performed by another device or a group of devices separate from or including the controller platform, such as a client device (e.g., client device 210) and/or a network device (e.g., network device 240).

As shown in FIG. 5, process 500 may include receiving network data associated with a network, wherein the network includes a plurality of network devices interconnected by links (block 510). For example, the controller platform (e.g., using computing resource 224, processor 320, communication interface 370, and/or the like) may receive network data associated with a network, as described above in connection with FIGS. 1A-3. In some aspects, the network may include a plurality of network devices interconnected by links.

As further shown in FIG. 5, process 500 may include receiving constraints associated with determining a network plan for the network (block 520). For example, the controller platform (e.g., using computing resource 224, processor 320, communication interface 370, and/or the like) may receive constraints associated with determining a network plan for the network, as described above in connection with FIGS. 1A-3.

As further shown in FIG. 5, process 500 may include determining a plurality of potential network plans for the network based on the constraints and the network data (block 530). For example, the controller platform (e.g., using computing resource 224, processor 320, memory 330, and/or the like) may determine a plurality of potential network plans for the network based on the constraints and the network data, as described above in connection with FIGS. 1A-3.

As further shown in FIG. 5, process 500 may include generating a multilayer and interactive user interface associated with the plurality of potential network plans, wherein the multilayer and interactive user interface includes information identifying the plurality of potential network plans and a graphical representation of a selected one of the plurality of potential network plans, wherein the graphical representation includes graphical representations of an IP layer and an optical layer of the selected one of the plurality of potential network plans; and (block 540). For example, the controller platform (e.g., using computing resource 224, processor 320, storage component 340, and/or the like) may generate a multilayer and interactive user interface associated with the plurality of potential network plans, as described above in connection with FIGS. 1A-3. In some aspects, the multilayer and interactive user interface may include information identifying the plurality of potential network plans and a graphical representation of a selected one of the plurality of potential network plans. The graphical representation may include graphical representations of an IP layer and an optical layer of the selected one of the plurality of potential network plans.

As further shown in FIG. 5, process 500 may include providing, to a client device, the multilayer and interactive user interface associated with the plurality of potential network plans, wherein the multilayer and interactive user interface is capable of providing views of the graphical representation from multiple angles and multiple orientations (block 550). For example, the controller platform (e.g., using computing resource 224, processor 320, memory 330, storage component 340, communication interface 370, and/or the like) may provide, to a client device, the multilayer and interactive user interface associated with the plurality of potential network plans, as described above in connection with FIGS. 1A-3. In some aspects, the multilayer and interactive user interface may be capable of providing views of the graphical representation from multiple angles and multiple orientations.

Process 500 may include additional implementations, such as any single implementation or any combination of implementations described below and/or in connection with one or more other processes described elsewhere herein.

In some implementations, the controller platform may determine a plurality of costs associated with the plurality of potential network plans based on the network data. The multilayer and interactive user interface may include information identifying the plurality of costs associated with the plurality of potential network plans.

In some implementations, the controller platform may receive, via the multilayer and interactive user interface, selections of portions of one of the plurality of network plans, may perform multiple optimizations, in parallel, on the portions of the one of the plurality of network plans, and may provide, to the client device and via the multilayer and interactive user interface, results of the multiple optimizations.

In some implementations, the controller platform may receive, from the client device, input that identifies a particular potential network plan of the plurality of potential network plans, and may cause the particular network plan to be implemented by the plurality of network devices.

In some implementations, the multilayer and interactive user interface may include a graphical representation of a first one of the plurality of potential network plans, and an animation depicting differences when transitioning from the first one of the plurality of potential network plans to a second one of the plurality of potential network plans.

In some implementations, when determining the plurality of potential network plans for the network, the controller platform may determine candidate links for each of the plurality of potential network plans based on the constraints, may determine candidate paths for each of the plurality of potential network plans based on the constraints, and may determine the plurality of potential network plans for the network based on the candidate links and the candidate paths.

In some implementations, the controller platform may determine a plurality of costs associated with the plurality of potential network plans based on the network data, may identify a potential network plan that minimizes costs associated with operating the network based on the plurality of costs associated with the plurality of potential network plans, and may provide, to the client device and via the multilayer and interactive user interface, information identifying the potential network plan that minimizes costs.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Figure 6:
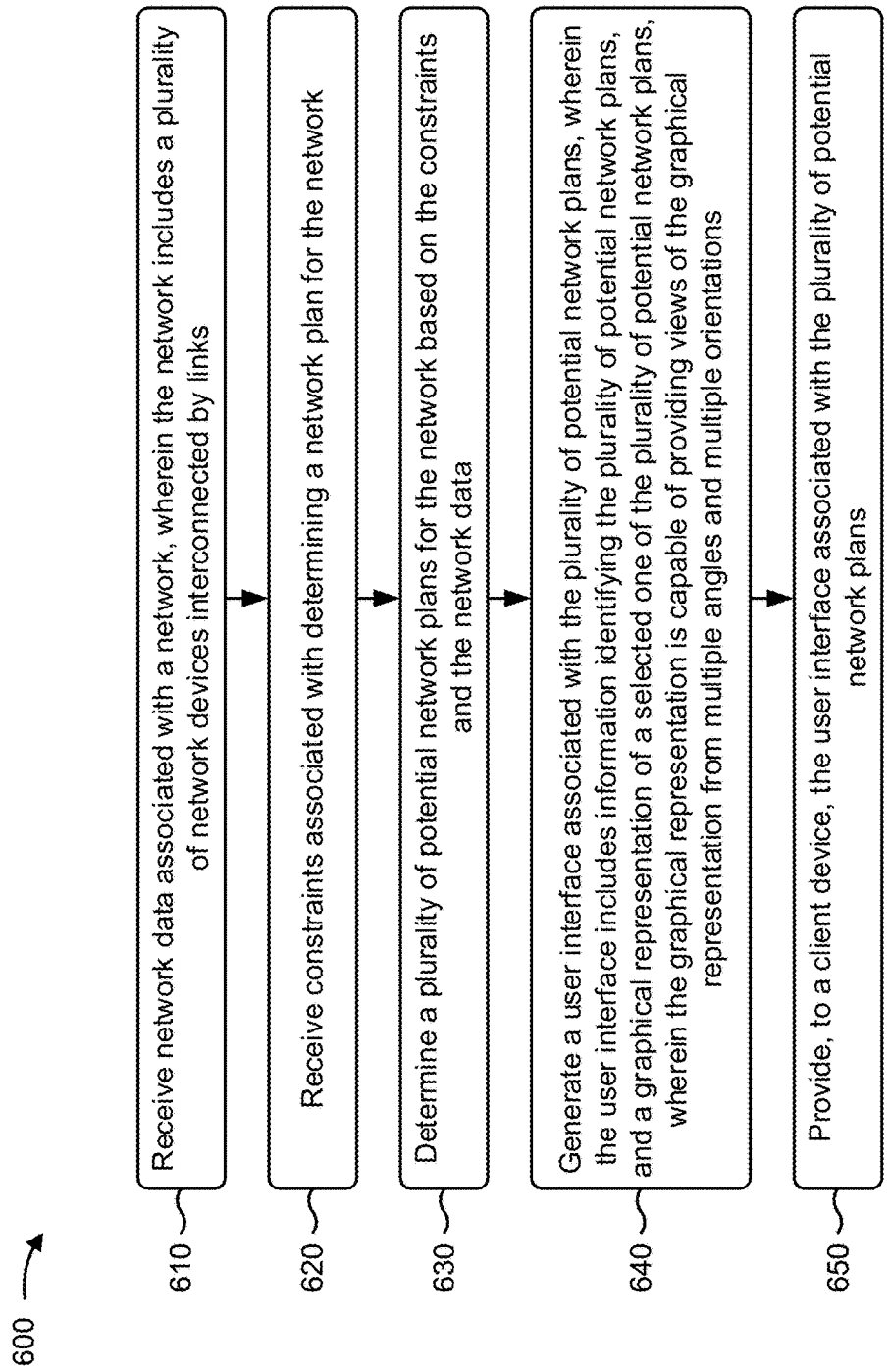

FIG. 6 is a flow chart of an example process 600 for providing multilayer and interactive user interfaces for displaying features of an optimized network plan. In some implementations, one or more process blocks of FIG. 6 may be performed by a controller platform (e.g., controller platform 220). In some implementations, one or more process blocks of FIG. 6 may be performed by another device or a group of devices separate from or including the controller platform, such as a client device (e.g., client device 210) and/or a network device (e.g., network device 240).

As shown in FIG. 6, process 600 may include receiving network data associated with a network, wherein the network includes a plurality of network devices interconnected by links (block 610). For example, the controller platform (e.g., using computing resource 224, processor 320, communication interface 370, and/or the like) may receive network data associated with a network, as described above in connection with FIGS. 1A-3. In some aspects, the network may include a plurality of network devices interconnected by links.

As further shown in FIG. 6, process 600 may include receiving constraints associated with determining a network plan for the network (block 620). For example, the controller platform (e.g., using computing resource 224, processor 320, communication interface 370, and/or the like) may receive constraints associated with determining a network plan for the network, as described above in connection with FIGS. 1A-3.

As further shown in FIG. 6, process 600 may include determining a plurality of potential network plans for the network based on the constraints and the network data (block 630). For example, the controller platform (e.g., using computing resource 224, processor 320, memory 330, and/or the like) may determine a plurality of potential network plans for the network based on the constraints and the network data, as described above in connection with FIGS. 1A-3.

As further shown in FIG. 6, process 600 may include generating a user interface associated with the plurality of potential network plans, wherein the user interface includes information identifying the plurality of potential network plans and a graphical representation of a selected one of the plurality of potential network plans, wherein the graphical representation is capable of providing views of the graphical representation from multiple angles and multiple orientations; and (block 640). For example, the controller platform (e.g., using computing resource 224, processor 320, storage component 340, and/or the like) may generate a user interface associated with the plurality of potential network plans, as described above in connection with FIGS. 1A-3. In some aspects, the user interface may include information identifying the plurality of potential network plans and a graphical representation of a selected one of the plurality of potential network plans. In some aspects, the graphical representation may be capable of providing views of the graphical representation from multiple angles and multiple orientations.

As further shown in FIG. 6, process 600 may include providing, to a client device, the user interface associated with the plurality of potential network plans (block 650). For example, the controller platform (e.g., using computing resource 224, processor 320, memory 330, storage component 340, communication interface 370, and/or the like) may provide, to a client device, the user interface associated with the plurality of potential network plans, as described above in connection with FIGS. 1A-3.

Process 600 may include additional implementations, such as any single implementation or any combination of implementations described below and/or in connection with one or more other processes described elsewhere herein.

In some implementations, the controller platform may determine a plurality of costs associated with the plurality of potential network plans based on the network data, may determine a plurality of penalties associated with failures of the plurality of potential network plans in meeting traffic demands of the network, may add the plurality of penalties to the plurality of costs, may identify a potential network plan that minimizes costs associated with operating the network based on adding the plurality of penalties to the plurality of costs, and may provide, to the client device and via the user interface, information identifying the potential network plan that minimizes costs.

In some implementations, the user interface may include information that permits a user of the client device to change one or more parts of one of the plurality of potential network plans. In some implementations, the controller platform may receive, from the client device and via the user interface, a selection of a potential network plan of the plurality of potential network plans, and may cause the potential network plan to be implemented in the network by the plurality of network devices. In some implementations, the user interface may include graphical representations of routes associated with a selected traffic demand flow.

In some implementations, the plurality of network devices may be interconnected by the links at an Internet protocol (IP) layer and an optical layer of the network. In some implementations, the user interface may include a graphical representation of a selected link of an IP layer of the selected one of the plurality of potential network plans. The graphical representation of the selected link of the IP layer may be highlighted when selected. The user interface may include a graphical representation of a route of an optical layer of the selected one of the plurality of potential network plans. The route of the optical layer may correspond to the link of the IP layer and may be automatically generated and highlighted when the link of the IP layer is selected.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

The foregoing disclosure provides illustration and description, but is not intended to be exhaustive or to limit the implementations to the precise form disclosed. Modifications and variations may be made in light of the above disclosure or may be acquired from practice of the implementations.

As used herein, the term "component" is intended to be broadly construed as hardware, firmware, or a combination of hardware and software.

Some implementations are described herein in connection with thresholds. As used herein, satisfying a threshold may, depending on the context, refer to a value being greater than the threshold, more than the threshold, higher than the threshold, greater than or equal to the threshold, less than the threshold, fewer than the threshold, lower than the threshold, less than or equal to the threshold, equal to the threshold, or the like.

Certain user interfaces have been described herein and/or shown in the figures. A user interface may include a graphical user interface, a non-graphical user interface, a text-based user interface, and/or the like. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
   receiving, by a device, network data associated with a network,
      wherein the network includes a plurality of network devices interconnected by links at an Internet protocol (IP) layer and an optical layer of the network;
   receiving, by the device, constraints associated with determining a network plan for the network;
   determining, by the device, a plurality of potential network plans for the network based on the constraints and the network data;
   generating, by the device, a multilayer and interactive user interface associated with the plurality of potential network plans,
      wherein the multilayer and interactive user interface includes:
         information enabling selection of one of the plurality of potential network plan,
         a graphical representation of each of the plurality of potential network plans, when selected, and
         a graphical animation depicting differences between a selected two of the plurality of potential network plans,
            wherein the graphical animation is capable of providing views of the selected two of the plurality of potential network plans from multiple angles and multiple orientations;
   providing, by the device, the multilayer and interactive user interface to a client device;
   receiving, by the device and from the client device, information indicating an interaction with the multilayer and interactive user interface;
   modifying, by the device, the multilayer and interactive user interface, based on the information indicating the interaction, to generate a modified multilayer and interactive user interface associated with the plurality of potential network plans; and
   providing, by the device and to the client device, the modified multilayer and interactive user interface associated with the plurality of potential network plans.

2. The method of claim 1, further comprising:
   identifying a potential network plan, of the plurality of potential network plans, that minimizes costs associated with operating the network; and
   causing the identified potential network plan to be implemented in the network by the plurality of network devices.

3. The method of claim 1, wherein the multilayer and interactive user interface includes:
   a graphical representation of a selected one of the plurality of potential network plans,
      wherein the graphical representation is capable of providing views of the selected one of the plurality of potential network plans from multiple angles and multiple orientations, and
      wherein the graphical representation includes graphical representations of an IP layer and an optical layer of the selected one of the plurality of potential network plans, and,
   graphical representations of routes associated with a selected traffic demand flow.

4. The method of claim 1, wherein the multilayer and interactive user interface includes:
   a graphical representation of a selected one of the plurality of potential network plans,
   a graphical representation of a selected link of an IP layer of the selected one of the plurality of potential network plans,
      wherein the graphical representation of the selected link of the IP layer is highlighted when selected, and
   a graphical representation of a route of an optical layer of the selected one of the plurality of potential network plans,
      wherein the route of the optical layer corresponds to the selected link of the IP layer, and
      wherein the route of the optical layer is automatically generated and highlighted when the link of the IP layer is selected.

5. The method of claim 1, wherein the multilayer and interactive user interface includes:
   information identifying the plurality of potential network plans,
   information identifying costs associated with the plurality of potential network plans, and
   graphical representations of links provided in an IP layer of a selected one of the plurality of potential network plans, wherein the graphical representations of the links provided in the IP layer are coded based on utilization and are marked if unutilized.

6. The method of claim 1, wherein the multilayer and interactive user interface includes:
information enabling input of a value for node and link failures associated with a selected one of the plurality of potential network plans,
wherein the value for the node and link failures adjusts a time associated with determining a cost for the selected one of the plurality of potential network plans.

7. A device, comprising:
one or more memories; and
one or more processors, communicatively coupled to the one or more memories, to:
receive network data associated with a network,
wherein the network includes a plurality of network devices interconnected by links;
receive constraints associated with determining a network plan for the network;
determine a plurality of potential network plans for the network based on the constraints and the network data;
generate a multilayer and interactive user interface associated with the plurality of potential network plans,
wherein the multilayer and interactive user interface includes:
information identifying the plurality of potential network plans,
a graphical representation of a selected one of the plurality of potential network plans,
wherein the graphical representation includes graphical representations of an IP layer and an optical layer of the selected one of the plurality of potential network plans, and
a graphical animation depicting differences between a selected two of the plurality of potential network plans,
wherein the graphical animation is capable of providing views of the selected two of the plurality of potential network plans from multiple angles and multiple orientations; and
provide, to a client device, the multilayer and interactive user interface associated with the plurality of potential network plans,
wherein the multilayer and interactive user interface is capable of providing views of the graphical representation from multiple angles and multiple orientations.

8. The device of claim 7, wherein the one or more processors are further to:
determine a plurality of costs associated with the plurality of potential network plans based on the network data; and
wherein the one or more processors, when generating the multilayer and interactive user interface, are to:
generate the multilayer and interactive user interface based on determining the plurality of costs associated with the plurality of potential network plans.

9. The device of claim 7, wherein the one or more processors are further to:
receive, via the multilayer and interactive user interface, selections of portions of one of the plurality of potential network plans;
perform multiple optimizations, in parallel, on the portions of the one of the plurality of potential network plans; and
provide, to the client device and via the multilayer and interactive user interface, results of the multiple optimizations.

10. The device of claim 7, wherein the one or more processors are further to:
receive, from the client device, input that identifies a particular potential network plan of the plurality of potential network plans; and
cause the particular potential network plan to be implemented by the plurality of network devices.

11. The device of claim 7, wherein the one or more processors, when determining the plurality of potential network plans for the network, are to:
determine candidate links for each of the plurality of potential network plans based on the constraints;
determine candidate paths for each of the plurality of potential network plans based on the constraints; and
determine the plurality of potential network plans for the network based on the candidate links and the candidate paths.

12. The device of claim 7, wherein the one or more processors are further to:
determine a plurality of costs associated with the plurality of potential network plans based on the network data;
identify a potential network plan that minimizes costs associated with operating the network based on the plurality of costs associated with the plurality of potential network plans; and
provide, to the client device and via the multilayer and interactive user interface, information identifying the potential network plan that minimizes costs.

13. A non-transitory computer-readable medium storing instructions, the instructions comprising:
one or more instructions that, when executed by one or more processors, cause the one or more processors to:
receive network data associated with a network,
wherein the network includes a plurality of network devices interconnected by links;
receive constraints associated with determining a network plan for the network;
determine a plurality of potential network plans for the network based on the constraints and the network data;
generate a user interface associated with the plurality of potential network plans,
wherein the user interface includes:
information identifying the plurality of potential network plans,
a graphical representation of a selected one of the plurality of potential network plans,
wherein the graphical representation is capable of providing views of the graphical representation from multiple angles and multiple orientations, and
a graphical animation depicting differences between a selected two of the plurality of potential network plans,
wherein the graphical animation is capable of providing views of the selected two of the plurality of potential network plans from multiple angles and multiple orientations; and
provide, to a client device, the user interface associated with the plurality of potential network plans.

14. The non-transitory computer-readable medium of claim 13, wherein the instructions further comprise:
one or more instructions that, when executed by the one or more processors, cause the one or more processors to:
determine a plurality of costs associated with the plurality of potential network plans based on the network data;
determine a plurality of penalties associated with failures of the plurality of potential network plans in meeting traffic demands of the network;
add the plurality of penalties to the plurality of costs;
identify a potential network plan, of the plurality of potential network plans, that minimizes costs associated with operating the network based on adding the plurality of penalties to the plurality of costs; and
provide, to the client device and via the user interface, information identifying the potential network plan that minimizes costs.

15. The non-transitory computer-readable medium of claim 13, wherein the user interface includes:
information that permits a user of the client device to change one or more parts of one of the plurality of potential network plans.

16. The non-transitory computer-readable medium of claim 13, wherein the instructions further comprise:
one or more instructions that, when executed by the one or more processors, cause the one or more processors to:
receive, from the client device and via the user interface, a selection of a potential network plan of the plurality of potential network plans; and
cause the potential network plan to be implemented in the network by the plurality of network devices.

17. The non-transitory computer-readable medium of claim 13, wherein the user interface includes:
graphical representations of routes associated with a selected traffic demand flow.

18. The non-transitory computer-readable medium of claim 13, wherein the plurality of network devices are interconnected by the links at an Internet protocol (IP) layer and an optical layer of the network, and
wherein the user interface includes:
a graphical representation of a selected link of an IP layer of the selected one of the plurality of potential network plans,
wherein the graphical representation of the selected link of the IP layer is highlighted when selected, and
a graphical representation of a route of an optical layer of the selected one of the plurality of potential network plans,
wherein the route of the optical layer corresponds to the selected link of the IP layer, and
wherein the route of the optical layer is automatically generated and highlighted when the link of the IP layer is selected.

19. The method of claim 1, wherein the constraints associated with determining the network plan for the network comprise one or more of:
a constraint indicating a particular time period associated with determining the network plan, or
a constraint indicating a failure threshold associated with paths provided through the network by the network devices and the links.

20. The device of claim 7, wherein the constraints associated with determining the network plan for the network comprise one or more of:
a constraint indicating a particular time period associated with determining the network plan, or
a constraint indicating a failure threshold associated with paths provided through the network by the network devices and the links.

\* \* \* \* \*